US007794835B2

(12) United States Patent
Katano et al.

(10) Patent No.: US 7,794,835 B2

(45) **Date of Patent: *Sep. 14, 2010**

(54) FIXING SOLUTION, CAPSULE STRUCTURE, FIXING METHOD, FIXING DEVICE AND IMAGE FORMING APPARATUS

(75) Inventors: Yasuo Katano, Kanagawa (JP); Tsuneo Kurotori, Tokyo (JP); Hiromichi Komai, Kanagawa (JP); Hidenori Tomono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/276,528

(22) Filed: Nov. 24, 2008

(65) Prior Publication Data

US 2009/0081571 A1 Mar. 26, 2009

Related U.S. Application Data

(63) Continuation of application No. 11/259,023, filed on Oct. 27, 2005, now Pat. No. 7,713,622.

(30) Foreign Application Priority Data

Nov. 2, 2004 (JP) ............................. 2004-319429
Dec. 27, 2004 (JP) ............................. 2004-375734

(51) Int. Cl.
*B32B 25/00* (2006.01)

(52) U.S. Cl. ............... 428/402.2; 428/402; 428/402.21; 430/33; 430/124.21; 525/400

(58) Field of Classification Search ................. 430/402, 430/402.2, 402.21, 33, 124.21
See application file for complete search history.

(56) References Cited

U.S. PATENT DOCUMENTS 3,080,250 A * 3/1963 Claus ....................... 430/109.3
3,318,212 A 5/1967 Rubin (Continued)

FOREIGN PATENT DOCUMENTS

EP 0 636 946 A1 2/1995

(Continued)

OTHER PUBLICATIONS

Translation of 10-2004-070530 published Aug. 2004 by Park.*

(Continued)

*Primary Examiner*—Mark F Huff
*Assistant Examiner*—Peter L Vajda
(74) *Attorney, Agent, or Firm*—Oblon, Spivak, McClelland, Maier & Neustadt, L.L.P.

(57) ABSTRACT

A fixing solution for fixing toner to a recording medium, includes aliphatic ester held by solvent in a soluble manner, and having solubility or swelling property with respect to resin included in the toner.

6 Claims, 11 Drawing Sheets

U.S. PATENT DOCUMENTS

| | | | | |
|---|---|---|---|---|
| 3,893,761 | A | 7/1975 | Buchan et al. | |
| 3,907,695 | A | 9/1975 | Amidon et al. | |
| 4,435,067 | A | 3/1984 | Draai et al. | |
| 5,333,042 | A | 7/1994 | Brennan et al. | |
| 5,476,739 | A | 12/1995 | Takama et al. | |
| 6,348,218 | B1 * | 2/2002 | Hed et al. | 424/489 |
| 2004/0131402 | A1 | 7/2004 | Kurotori et al. | |
| 2006/0115762 | A1 * | 6/2006 | Katano et al. | 430/124 |
| 2006/0263712 | A1 | 11/2006 | Katano et al. | |
| 2007/0147913 | A1 | 6/2007 | Katano et al. | |
| 2007/0243483 | A1 | 10/2007 | Katano et al. | |
| 2008/0063446 | A1 | 3/2008 | Katano et al. | |
| 2008/0213002 | A1 | 9/2008 | Katano et al. | |

FOREIGN PATENT DOCUMENTS

| | | | |
|---|---|---|---|
| EP | 0636946 A1 | * | 2/1995 |
| GB | 1 411 120 | | 10/1975 |
| JP | 58-40570 | | 3/1983 |
| JP | 59-119364 | | 7/1984 |
| JP | 3-45830 | | 7/1991 |
| JP | 2000-122391 | | 4/2000 |
| JP | 3290513 | | 3/2002 |
| JP | 2004-109747 | | 4/2004 |
| JP | 2004-109749 | | 4/2004 |
| JP | 2004-109750 | | 4/2004 |
| JP | 2004-109751 | | 4/2004 |
| JP | 2004-294847 | | 10/2004 |
| KR | 10-2004-070530 | * | 8/2004 |

OTHER PUBLICATIONS

Machine generated translation of Korean Patent 10-2004-070530, Aug. 11, 2004.

U.S. Appl. No. 12/276,528, filed Nov. 24, 2008, Katano et al.

* cited by examiner

FIXING SOLUTION, CAPSULE STRUCTURE, FIXING METHOD, FIXING DEVICE AND IMAGE FORMING APPARATUS

The present application is a Continuation of U.S. application Ser. No. 11/259,023, filed Oct. 27, 2005, now U.S. Pat. No. 7,713,622 the entire contents of which are hereby incorporated by reference.

BACKGROUND OF THE INVENTION

1. Field of the Invention

The present invention relates to a fixing solution, a capsule structure, a fixing method, a fixing device and an image forming apparatus, and, in particular, to a fixing solution, a capsule structure, a fixing method, a fixing device and an image forming apparatus, applying a fixing solution which is provided to toner so as to cause the toner to dissolve or swell, for fixing it to a recording medium.

2. Description of the Related Art

An image forming apparatus applied in a printer, a facsimile apparatus, a copier or such records an image such as characters, symbols or such on a recording medium such as paper, cloth, OHP sheet or such, based on given image information.

There are various types of such recording apparatuses. Thereamong, an electrophotographic type image forming apparatus has been widely applied for an office use since a high definition image can be rapidly recorded on ordinary paper thereby. For this type of image forming apparatus, a thermal fixing type has spread widely for fixing an image to a recording medium in terms of a fixing speed, a fixing image quality and so forth. According to the thermal fixing type, a toner on a recording medium is heated, melted and pressed, for fixing it to the recording medium. However, when the thermal fixing type is applied in the electrophotographic type of image forming apparatus, more than half of power consumption is consumed for heating a toner. In an environmental view point, a fixing device requiring a reduced power consumption is demanded.

Therefor, a wet-type fixing method of fixing a toner in such a manner that the toner is dissolved or swelled by a fixing solution, and is dried, has been proposed (see Japanese Laid-open Patent Application No. 59-119364, Japanese Patent Publication No. 3-45830, Japanese Patent No. 3290513 and Japanese Laid-open Patent Application No. 2000-122391, disclosing image forming apparatuses applying the wet-type fixing method). According to this method, heating processing required in the above-mentioned thermal fixing type, for dissolving a toner, is not required. Accordingly, this method is superior in a power saving viewpoint since a power consumption can be reduced. Further, since a worming up time, required in the thermal fixing type, is not required in the wet-type fixing method, quick starting is made possible.

However, in the wet-type fixing method, when a fixing substance dissolving or swelling a toner is not uniformly included in a fixing solution, unevenness occurs in a contacting state between the toner and the fixing substance, penetration of the fixing substance in the toner delays, and thus, a fixing speed may degrade. Further, the fixing substance for dissolving or swelling a toner or a detergent is applied to mix the fixing substance in the fixing solution, odor may be generated therefrom. Accordingly, when fixing processing in this fixing method is carried out for a large quantity of printed matters, a user may have an unpleasant feeling thereby. As a result, an image forming apparatus applying the wet-type fixing method may not be suitable to be set in an office, a house or such, in which humans stay.

SUMMARY OF THE INVENTION

The present invention has been devised in consideration of the problem, and, an object of the present invention is to provide a fixing solution, a capsule structure, a fixing method, a fixing device and an image forming apparatus, with which, generation of odor is reduced, and a toner can be fixed rapidly.

According to a first aspect of the present invention, a fixing solution for fixing a toner to a recording medium includes: aliphatic ester held by a solvent in a soluble manner, and having solubility or a swelling property with respect to a resin included in the toner.

In this configuration, since aliphatic ester which is held in a state of soluble with respect to solvent, and has solubility or a swelling property with respect to a resin included in toner is included, it is possible to provide a fixing solution with which, generation of odor is reduced, and rapid toner fixing is achieved.

According to a second aspect of the present invention, in the fixing solution according to the first aspect of the present invention, the aliphatic ester may include saturated aliphatic ester.

In this configuration, since saturated aliphatic ester is included in the aliphatic ester, storage stability can be improved.

According to a third aspect of the present invention, in the fixing solution according to the second aspect of the present invention, the saturated aliphatic ester may be a compound expressed by the following general formula:

$$R_1COOR_2,$$

where:

$R_1$ denotes an alkyl group having a carbon number in a range between 11 and 14; and $R_2$ denotes an alkyl group having a carbon number in a range between 1 and 3.

In this configuration, solubility or a swelling property with respect to a resin included in a toner can be improved.

According to a fourth aspect of the present invention, in the fixing solution according to any one of the first through third aspects of the present invention, the aliphatic ester may include aliphatic dicarboxylate ester.

In this configuration, a resin included in a toner can be dissolved or swelled rapidly.

According to a fifth aspect of the present invention, in the fixing solution according to the fourth aspect of the present invention, the aliphatic dicarboxylate ester may be a compound expressed by the following general formula:

$$R_3(COOR_4)_2,$$

where:

$R_3$ denotes an alkylene group having a carbon number in a range between 3 and 8; and $R_4$ denotes an alkyl group having a carbon number in a range between 2 and 5.

In this configuration, solubility or a swelling property with respect to a resin included in a toner can be improved.

According to a sixth aspect of the present invention, in the fixing solution according to any one of the first through fifth aspects of the present invention, the aliphatic ester may include aliphatic dicarboxylate dialkoxyalkyl.

In this configuration, fixing performance for a toner can be improved.

In a seventh aspect of the present invention, in the fixing solution according to the sixth aspect of the present invention, the aliphatic dicarboxylate dialkoxyalkyl may be a compound expressed by the following general formula:

$$R_5(COOR_6—O—R_7)_2,$$

where:

$R_5$ denotes an alkylene group having a carbon number in a range between 2 and 8;

$R_6$ denotes an alkylene group having a carbon number in a range between 2 and 4; and $R_7$ denotes an alkyl group having a carbon number in a range between 1 and 4.

In this configuration, solubility or a swelling property with respect to a resin included in a toner can be improved.

According to an eighth aspect of the present invention, in the fixing solution according to any one of the first through seventh aspects of the present invention, the solvent may include water.

In this configuration, generation of odor can be further reduced.

According to a ninth aspect of the present invention, a capsule structure has:

a core agent made of the fixing solution according to any one of the first through eighth aspects of the present invention; and an outer skin made of a material insoluble with respect to the core agent.

By applying this configuration, the capsule structure can be provided, with which, generation of odor can be reduced, and also, a toner can be rapidly fixed.

According to a tenth aspect of the present invention, a capsule structure has:

a core agent made of the fixing solution according to any one of the first through eighth aspects of the present invention;

an inner skin made of a material insoluble with respect to the core agent; and an outer skin made of a material having solubility or a swelling property with respect to the core agent.

By applying this configuration, the capsule structure can be provided, with which, generation of odor can be reduced, and also, a toner can be rapidly fixed.

According to an eleventh aspect of the present invention, a fixing method for fixing a toner to a recording medium, includes the steps of:

a) providing the capsule structure according to the ninth or tenth aspect of the present invention to the toner; and b) fixing the toner to the recording medium by causing the fixing solution to contact the toner as a result of breaking the capsule structure.

By applying this configuration, the fixing method can be provided, with which, generation of odor can be reduced, and also, a toner can be rapidly fixed.

According to a twelfth aspect of the present invention, a fixing device configured to fix a toner to a recording medium, includes:

a part configured to provide the capsule structure according to the ninth or tenth aspect of the present invention to the toner; and a part configured to break the capsule structure.

By applying this configuration, the fixing device can be provided, with which, generation of odor can be reduced, and also, a toner can be rapidly fixed.

According to a thirteenth aspect of the present invention, in the tone fixing device according to the twelfth aspect of the present invention, a part configured to electrically charge the capsule structure, and applying an electric field between the part configured to provide the capsule structure and the recording medium, may be further provided.

In this configuration, the capsule structure can be provided selectively to a toner.

According to a fourteenth aspect of the present invention, a fixing device configured to fix a toner to a recording medium, includes:

a part configured to provide one of the capsule structure according to the ninth aspect of the present invention and the capsule structure according to the tenth aspect of the present invention selectively to the toner; and a part configured to break the capsule structure.

In this configuration, the fixing device, with which, generation of odor is reduced and a toner can be fixed rapidly, can be provided.

Thus, according to the present invention, a fixing solution by which a toner can be rapidly fixed with reduced odor generation, a capsule structure including the fixing solution, a fixing method and a fixing device applying the capsule structure to fix a toner, can be provided.

According to a fifteenth aspect of the present invention, in a fixing method for fixing a toner image on a recording medium with a fixing solution, which toner image has been produced on the recording medium with the use of nonvolatile or approximately nonvolatile liquid developer having an insulating carrier solution with a solid component comprising a resin and a pigment dispersed in the insulating carrier solution, and having high viscosity in a range between 100 and 10000 [mPa·s]:

the fixing solution is made of a fixing solute having a property to dissolve or swelling a toner which forms the toner image and a fixing solvent diluting the fixing solute; and the fixing solvent includes aliphatic ester having solubility or a swelling property with respect to the resin included in the toner.

According to a sixteenth aspect of the present invention, in the fixing method according to the fifteenth aspect of the present invention, the aliphatic ester may include saturated aliphatic ester.

According to a seventeenth aspect of the present invention, in the fixing method according to the sixteenth aspect of the present invention, the saturated aliphatic ester may be made of a compound expressed by the following general formula:

$$R_1—COO—R_2,$$

where:

$R_1$ denotes an alkyl group having a carbon number in a range between 11 and 14; and $R_2$ denotes an alkyl group having a carbon number in a range between 1 and 3.

According to an eighteenth aspect of the present invention, in the fixing method according to any one of the fifteenth through seventeenth aspects of the present invention, the aliphatic ester may include aliphatic dicarboxylate ester.

According to a nineteenth aspect of the present invention, in the fixing method according to the eighteenth aspect of the present invention, the aliphatic dicarboxylate ester may be made of a compound expressed by the following general formula:

$$R_3—(COO—R_4)_2,$$

where:

$R_3$ denotes an alkylene group having a carbon number in a range between 3 and 8; and $R_4$ denotes an alkyl group having a carbon number in a range between 2 and 5.

According to a twentieth aspect of the present invention, in the fixing method according to any one of the fifteenth through nineteenth aspects of the present invention, the aliphatic ester may include aliphatic dicarboxylate dialkoxyalkyl.

According to a twenty-first aspect of the present invention, in the fixing method according to the twentieth aspect of the present invention, the aliphatic dicarboxylate dialkoxyalkyl may be made of a compound expressed by the following general formula:

$$R_5—(COO—R_6—O—R_7)_2,$$

where:

$R_5$ denotes an alkylene group having a carbon number in a range between 2 and 8;

$R_6$ denotes an alkylene group having a carbon number in a range between 2 and 4; and $R_7$ denotes an alkyl group having a carbon number in a range between 1 and 4.

According to a twenty-second aspect of the present invention, in the fixing method according to any one of the fifteenth through twenty-first aspects of the present invention, the fixing solvent may include water.

According to a twenty-third aspect of the present invention, the fixing method according to any one of the fifteenth through twenty-second aspects of the present invention, may include the steps of:

providing the fixing solution to the toner image transferred to the recording medium by making a fixing coating roller, to which the fixing solution is made to adhere in a form of a thin layer, to contact the toner image; and fixing the toner image to the recording medium by applying a pressure to the toner image to which the fixing solution is thus provided.

According to a twenty-fourth aspect of the present invention, the fixing method according to any one of the fifteenth through twenty-second aspects of the present invention, may include the steps of:

providing the fixing solution in a form of mist to the toner image transferred to the recording medium in a non-contact manner; and fixing the toner image to the recording medium by applying a pressure to the toner image to which the fixing solution thus provided.

According to a twenty-fifth aspect of the present invention, the fixing method according to any one of the fifteenth through twenty-second aspects of the present invention, may include the steps of:

providing the fixing solution sprayed via a nozzle to the toner image transferred to the recording medium in a non-contact manner; and fixing the toner image to the recording medium by applying a pressure to the toner image to which the fixing solution is thus provided.

According to a twenty-sixth aspect of the present invention, a fixing device configured to fix a toner image to a recording medium with a fixing solution, which toner image has been produced on the recording medium with the use of a nonvolatile or approximately nonvolatile liquid developer having an insulating carrier solution with a solid component comprising a resin and a pigment dispersed in the insulating carrier solution, and having high viscosity in a range between 100 and 10000 [mPa·s], wherein:

the fixing solution comprises a solution comprising a fixing solute having a property to dissolve or swelling a toner which forms the toner image and a fixing solvent diluting the fixing solute; and the fixing solvent includes aliphatic ester having solubility or a swelling property with respect to the resin included in the toner.

According to a twenty-seventh aspect of the present invention, in the fixing device according to the twenty-sixth aspect of the present invention, the aliphatic ester may include saturated aliphatic ester.

According to a twenty-eighth aspect of the present invention, in the fixing device according to the twenty-seventh aspect of the present invention, the saturated aliphatic ester may be made of a compound expressed by the following general formula:

$$R_1—COO—R_2,$$

where:

$R_1$ denotes an alkyl group having a carbon number in a range between 11 and 14; and $R_2$ denotes an alkyl group having a carbon number in a range between 1 and 3.

According to a twenty-ninth aspect of the present invention, in the fixing device according to any one of the twenty-sixth through twenty-eighth aspects of the present invention, the aliphatic ester may include aliphatic dicarboxylate ester.

According to a thirtieth aspect of the present invention, in the fixing device according to the twenty-ninth aspect of the present invention, the aliphatic dicarboxylate ester may be made of a compound expressed by the following general formula:

$$R_3—(COO—R_4)_2,$$

where:

$R_3$ denotes an alkylene group having a carbon number in a range between 3 and 8; and $R_4$ denotes an alkyl group having a carbon number in a range between 2 and 5.

According to a thirty-first aspect of the present invention, in the fixing device according to any one of the twenty-sixth through thirtieth aspects of the present invention, the aliphatic ester may include aliphatic dicarboxylate dialkoxyalkyl.

According to a thirty-second aspect of the present invention, in the fixing device according to the thirty-first aspect of the present invention, the aliphatic dicarboxylate dialkoxyalkyl may be made of a compound expressed by the following general formula:

$$R_5—(COO—R_6—O—R_7)_2,$$

where:

$R_5$ denotes an alkylene group having a carbon number in a range between 2 and 8;

$R_6$ denotes an alkylene group having a carbon number in a range between 2 and 4; and $R_7$ denotes an alkyl group having a carbon number in a range between 1 and 4.

According to a thirty-third aspect of the present invention, in the fixing device according to any one of the twenty-sixth through thirty-second aspects of the present invention, the fixing solvent may include water.

According to a thirty-fourth aspect of the present invention, the fixing device according to any one of the twenty-sixth through thirty-third aspects of the present invention may include:

a fixing solution coating roller carrying the fixing solution on a surface thereof in a form of a thin layer, and coating the fixing solution to the toner image transferred to the recording medium by contacting the toner image; and a pressurizing roller applying a pressure to the toner image to which the fixing solution is thus coated.

According to a thirty-fifth aspect of the present invention, the fixing device according to any one of the twenty-sixth through thirty-third aspects of the present invention may include:

a fixing solution mist producing part configured to produce mist of the fixing solution and providing the fixing solution in a form of the mist to the toner image transferred to the recording medium in a non-contact manner; and a pressurizing roller applying a pressure to the toner image to which the fixing solution is thus coated.

According to a thirty-sixth aspect of the present invention, the fixing device according to any one of the twenty-sixth through thirty-third aspects of the present invention may include:

a fixing solution spraying nozzle spraying the fixing solution and providing the fixing solution to the toner image transferred to the recording medium in a non-contact manner; and a pressurizing roller applying a pressure to the toner image to which the fixing solution is thus coated.

According to a thirty-seventh aspect of the present invention, an image forming apparatus includes:

a latent image producing part configured to produce a latent image on a surface of a latent image carrier;

a developing part configured to develop the latent image produced by the latent image producing part by providing a nonvolatile or approximately nonvolatile liquid developer having an insulating carrier solution with a solid component comprising a resin and a pigment dispersed in the insulating carrier solution, and having high viscosity in a range between 100 and 10000 [mPa·s];

a transferring part configured to transfer the toner image produced on the latent image carrier to a transferring medium;

a cleaning part configured to clean a residual developing agent from the latent image carrier; and a fixing part configured to fix the toner image, thus transferred to the transferring medium, to the transferring medium, wherein:

as the fixing part, the fixing device according to any one of the twenty-sixth through thirty-sixth aspects of the present invention is applied.

In the fixing method or the fixing device according to any one of the fifteenth through thirty-seventh aspects of the present invention, since the fixing solution is a solution, the fixing solute having a property of dissolving or swelling a toner is held in the fixing solution in a state in which the fixing solute is soluble with respect to the solvent, that is, in a state in which the fixing solute is held in the fixing solution uniformly. As a result, when the fixing solution is made contact a toner image, the fixing solute can be made to contact the toner without non-uniformity, and penetration of the fixing solute in the toner can be achieved easier. Further, since aliphatic ester having solubility or a swelling property with respect to a resin included in the toner is included as the fixing solute, generation of odor can be reduced.

Thus, according to the present invention in the fifteenth through thirty-seventh aspects of the present invention, since penetration of the fixing solute in the toner can be achieved easier, the toner can be fixed rapidly. Further, since the fixing solute includes aliphatic ester, fixing can be carried out with reduced generation of odor.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENTS

Figure 1:
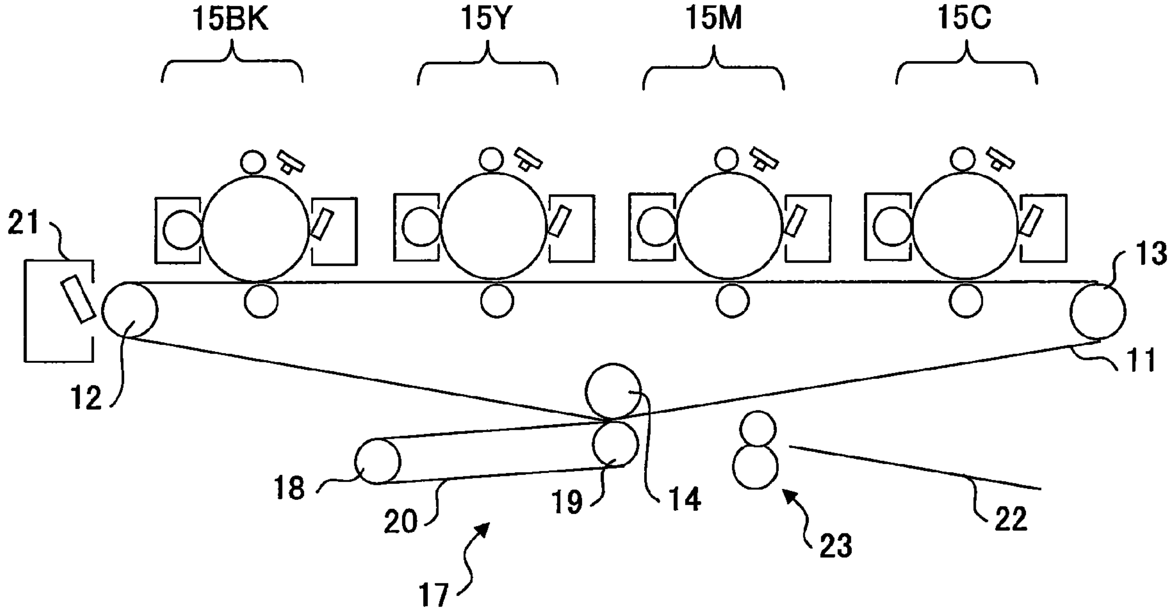
FIG. 1 shows an image forming apparatus according to an embodiment of the present invention.

Preferred embodiments of the present invention are described next with reference to figures.

First, embodiments according to the above-mentioned first through fourteenth aspects of the present invention are described.

A fixing solution according to the present invention includes aliphatic ester, held in a soluble state with respect to a solvent and having solubility or a swelling property with respect to a resin included in a toner. Thereby, a fixing solution, from which generation of odor is reduced, and by which a not-yet-fixed toner can be rapidly fixed, can be obtained. The aliphatic ester is applied as a softener softening a toner by dissolving or swelling the resin included in the toner. 'Held in a soluble state' means as being held in a size on the order of a molecule size on the order of hundreds of angstroms. The aliphatic ester preferably has acute oral toxicity test $LD_{50}$ larger than 3 g/kg in a viewpoint of a safety of humans.

The fixing solution according to the present invention can rapidly fix a not-yet-fixed toner image. This may be because, the aliphatic ester is held in a soluble state as mentioned above, and thus, it is likely to contact minute toner particles on the order of a range between 5 and 6 μm in its particle size.

According to the present invention, as the aliphatic ester, not only liquid having flowability, but also a gelatinous liquid, semisolid, such as wax, may be applied. Viscosity of aliphatic ester is preferably in a range between 1 mPa·s and 100 Pa·s.

According to the present invention, the solvent preferably includes water. Thereby, odor can be further reduced. Water does not correspond to a volatile organic compound (VOC), and thus, is very advantageous for an office environment. However, although solubility of aliphatic ester with respect to water is generally low, the aliphatic ester should be held in a soluble state in water. As a method therefor, the following method may be applied. That is, water is added to a detergent having a HLB value on the order of a range between 5 and 16, the aliphatic ester is added, and after that, stirring is carried out for a long time with a heat. As the detergent having the HLB value on the order of a range between 5 and 16, sucrose fatty esters such as sucrose laurate ester, sucrose myristate ester, sucrose ester stearate, or such, may be applied.

Further, as the solvent, a mixed solvent of water and a water soluble solvent may be applied. Also in this case, it is preferable that, after the aliphatic ester is once brought into a hydrophilic material such as an amphipathic organic compound, water soluble polymer, silica gel, or such, the aliphatic ester is held in a soluble state. As the water soluble solvent, ethanol, isopropanol or such may be applied.

According to the present invention, as a good solvent for the aliphatic ester, a hydrophobic solvent may be applied. As such a solvent, silicone oils, olefin family solvent, paraffin family solvent, fluorine family solvent or such may be applied, and, it is preferable to select from solvents having $LD_{50}$ of more than 3 g/kg. As silicone oils, tetramer, pentamer or such of polydimethylsiloxane or methylcyclosilixane having a viscosity on the order of a range between 1 and 10 mPa·s is suitable. As a paraffin family solvent, n-decane, n-dodecane, n-undecane, or such is suitable. As a fluorine family solvent, hydrofluoroether or such is suitable. Further, the solvent preferably has an appropriate volatility, and preferably has a boiling point in a range between 50 and 150° C.

A content of the aliphatic ester in a solvent is preferably on the order of a range between 0.5 and 50 weight %, and further preferably, in a range between 1 and 10 weight %. When a content of the aliphatic ester is smaller than 0.5 weight %, an effect of dissolving or swelling a toner is not sufficient, while, when it is larger than 50 weight %, flowability of a toner cannot be reduced for a long time, and a fixed toner layer thus may have adherence.

According to the present invention, an odor index of the aliphatic ester is preferably not more than 10. Thereby, discomfort can be eliminated in an ordinary office environment. When the aliphatic ester or the solvent generates unpleasant smell or irritating smell, usage in an office environment is not appropriate. Especially, since the aliphatic ester still remains after the toner is fixed, generation of unpleasant smell or irritating smell is not preferable for use. It is noted that, as a practical and accurate scale for odor for an office environment or such, an odor index (10 log(dilution ratio for reaching a no smelling state)) by means of Triangle Odor Bag Method for Odor Sensory Measurement, which is a sensory measurement, is applied.

Further, when the solvent has unpleasant smell or irritating smell, odor is generated at a time of fixing. Since a content of the solvent in the fixing solution is large, an odor index should be preferably not more than 7, and further, preferably, not more than 3.

According to the present invention, the aliphatic ester may preferably include saturated aliphatic ester. Thereby, storage stability (durability against oxidation or hydrolysis) can be improved. Further, thereby, safety for humans is high, and a resin included in a toner can be dissolved or swelled within one second. Further, saturate aliphatic ester has reduced adherence in a toner layer after the solvent evaporates. This may be because, saturated aliphatic acid produces an oil film on a surface of a softened toner layer.

According to the present invention, saturated aliphatic ester is a compound expressed by the following general formula:

$$R_1COOR_2$$

where it is preferable that $R_1$ denotes an alkyl group having a carbon number in a range between 11 and 14, and $R_2$ denotes an alkyl group having a carbon number in a range between 1 and 3. Thereby, solubility with respect to a resin included in a toner can be improved. Further, an odor index is not more than 10, and thus, unpleasant smell or irritating smell is not generated.

As the saturated aliphatic ester, ethyl laurate, hexyl laurate, ethyl tridecylate, isopropyl tridecylate, ethyl myristate, isopropyl myristate, or such, may be applied. As the resin included in the toner, polystyrene resin, styrene-acryl copolymer resin or polyester resin is suitable. Further, a wax component such as polyethylene or such may be included in the toner.

According to the present invention, the aliphatic ester may preferably include aliphatic dicarboxylate ester. Thereby, a resin included in a toner can be rapidly dissolved or swelled. For a high speed printing on the order of 60 ppm, a time required for providing the fixing solution to a not-yet-fixed toner image and fixing the toner may be preferably within one second. The above-mentioned configuration can satisfy this requirement. Further, since even a reduced amount of addition can result in achievement of dissolving or swelling of the resin included in the toner, a ratio of the softener required for the solvent can be reduced. For example, when a water soluble solvent is applied, the toner can be fixed with the softener content not more than 5 weight %.

According to the present invention, aliphatic dicarboxylate ester has the following general formula:

$$R_3(COOR_4)_2$$

where it is preferable that $R_3$ denotes an alkylene group having a carbon number in a range between 3 and 8, and $R_4$ denotes an alkyl group having a carbon number in a range between 2 and 5. Thereby, solubility with respect to a resin included in a toner can be improved. Further, since an odor index is not more than 10, unpleasant smell or irritating smell is not generated.

As the aliphatic dicarboxylate ester, succinate diethyl, diethyl adipate, diisobutyl adipate, diisopropyl adipate, diisodecyl adipate, diethyl sebacate, dibutyl sebacate, or such may be applied. The resin included in the toner is the same as the above mentioned.

According to the present invention, the aliphatic ester may preferably include aliphatic dicarboxylate dialkoxyalkyl. Thereby, toner fixing performance can be improved. The aliphatic dicarboxylate dialkoxyalkyl is slightly dissolved in water, and thus, it can be easily held in a soluble state when water is applied as the solvent.

According to the present invention, the aliphatic dicarboxylate dialkoxyalkyl has the following general formula:

$$R_5(COOR_6—O—R_7)_2$$

where it is preferable that $R_5$ denotes an alkylene group having a carbon number in a range between 2 and 8; $R_6$ denotes an alkylene group having a carbon number in as range between 2 and 4; and $R_7$ denotes an alkyl group having a carbon number in a range between 1 and 4. Thereby, solubility with respect to a resin included in a toner can be improved. Further, since an odor index is not more than 10, unpleasant smell or irritating smell is not generated.

As the aliphatic dicarboxylate dialkoxyalkyl, succinate diethoxyethyl, succinate dibutoxyethyl, diethoxyethyl adipate, dibutoxyethyl adipate, diethoxyethyl sebacate or such can be applied.

Figure 2:
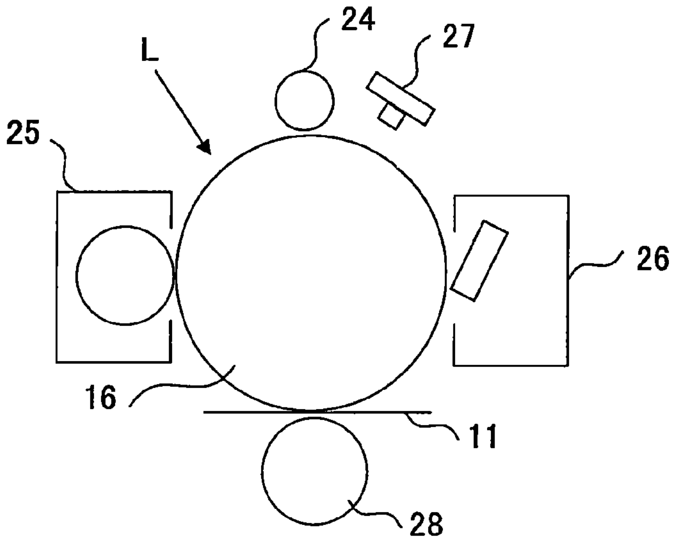
FIG. 2 shows a part of the image forming apparatus shown in FIG. 1.

Next, an embodiment of a case where the fixing solution according to the present invention described above is actually applied is described. FIG. 1 shows one example of an image forming apparatus in one embodiment of the present invention, which is an image forming apparatus in a tandem color electrophotographic type used as a copier, a printer or such. FIG. 2 shows a part of the image forming apparatus.

As shown, the image forming apparatus is provided with an intermediate transfer belt 11 as a toner image carrier. This intermediate transfer belt 11 is stretched by three supporting rollers 12, 13 and 14, and is thus configured to rotate clockwise. In a direction of rotation of the intermediate transfer belt 11, respective image forming units 15BK, 15Y, 15M and 15C, of black, yellow, magenta and cyan, are disposed. Above these image forming units, an exposing device, not shown, is provided. For example, in a case of a copier, a scanner reads image information of an original, and, the exposing device applies light L to a photosensitive drum 16 according to the image information for writing an electrostatic latent image thereon (see FIG. 2).

A secondary transfer device 17 is provided in a position opposite to the supporting roller 14 with respect to the intermediate transfer belt 11. The secondary transfer device 17 includes a secondary transfer belt 20 stretched by two supporting rollers 18 and 19. The secondary transfer belt 17 may be configured, not by a transfer belt, but by a transfer roller, instead. In a position opposite to the intermediate transfer belt 11 with respect to the supporting roller 12, a belt cleaning device 21 is disposed. The belt cleaning device 12 is provided for cleaning a residual toner from the intermediate transfer belt 11.

A recording medium (recording paper) 22 is introduced to a secondary transfer part by a pair of paper feeding rollers 23, and, when a toner image is transferred to the recording medium 22, transfer is carried out as a result of the secondary transfer belt 20 being pressed to the intermediate transfer belt 11.

After the toner image is thus transferred to the recording medium 22, the recording medium then undergoes a toner image fixing process by means of a fixing device. The toner image fixing process is described later with reference to FIGS. 3 through 9. The fixing device, shown in each of FIGS. 3, 7, 8 and 9, is also included in the image forming apparatus described above with reference to FIG. 1, although not shown in FIG. 1.

Next, the image forming units are described. As shown in FIG. 2, each image forming unit includes, around the photosensitive drum 16, a charging device 24, a developing device 25, a cleaning device 26 and an electricity removing device 27. Further, in a position opposite to the photosensitive drum 16 with respect to the intermediate transfer belt 11, a primary transfer device 28 is provided.

The charging device 24 is in a contacting charging type employing a changing roller. By contacting the photosensitive drum 16, and applying a voltage, the charging device 24 electrically charges a surface of the photosensitive drum 16 uniformly. As the charging device 24, a non-contacting-type one employing a non-contacting scorotron charging technology may be applied, instead.

The developing device 25 causes a toner of a developer to adhere to the electrostatic latent image on the photosensitive drum 16, and thus, visualizes it. A toner for each color includes a resin material colored in the respective color, and is dissolved or swelled by the fixing solution described later. The developing device 25 includes a stirring part and a developing part, not shown. A developer, not used in the developing is returned to the stirring part, and thus, reused. A toner concentration in the stirring part is detected by a toner concentration sensor, and a control is made such that the toner concentration may be constant.

The primary transfer device 28 transfers a toner image thus visualized on the photosensitive drum 16 to the intermediate transfer belt 11. In this example, a transfer roller type is applied in the primary transfer device 28, and is disposed to press the photosensitive drum 16 via the intermediate transfer belt 11. As the primary transfer device 28, other than this example, an electrically conductive brush type one, a non-contacting corona charging type one or such may be applied.

The cleaning device 26 removes an unnecessary toner from the photosensitive drum 16. As the cleaning device 26, a blade type one, configured to press the photosensitive drum 16, may be applied. The toner thus collected is then collected by a collecting screw or a toner recycling device, not shown, for the developing device 25, and, thus, may be reused there.

The electricity removing device 27 is made of a lamp, and initializes a surface electric potential of the photosensitive drum 16 by applying light thereto.

Figure 3:
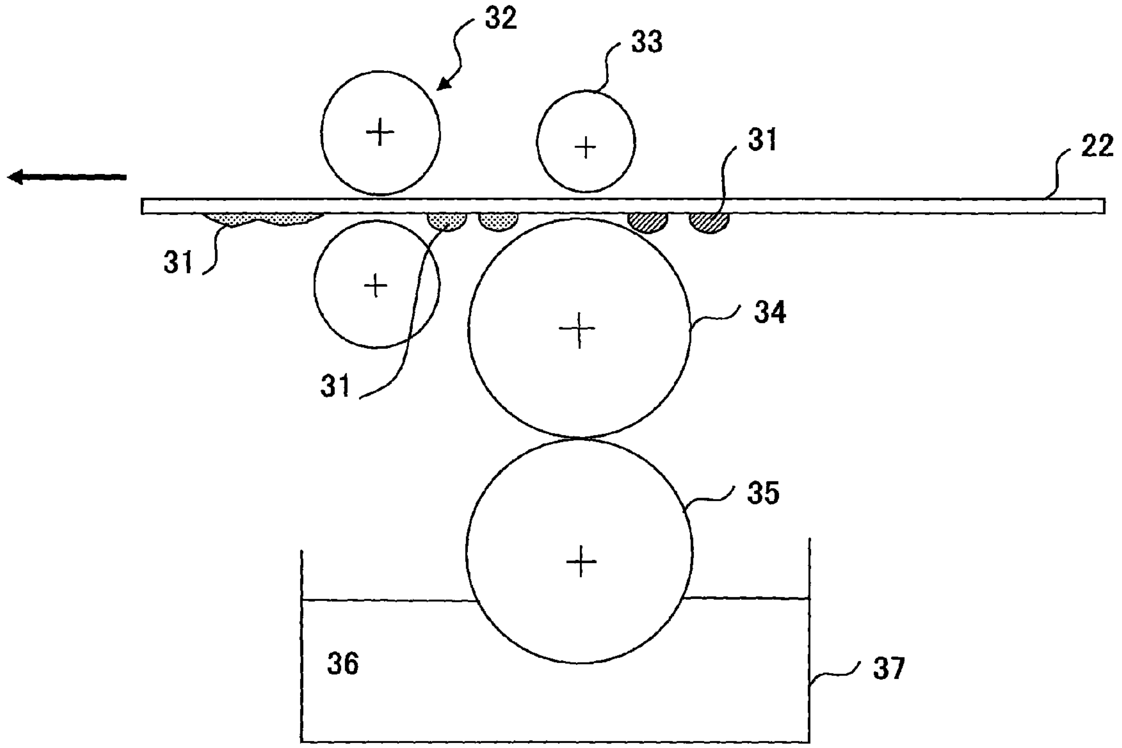
FIG. 3 shows a method of providing to a toner a fixing solution according to the present invention.

Next, a method of providing the fixing solution to the toner is described. FIG. 3 shows the fixing device actually carrying out the method of providing the fixing solution to the toner, i.e. carrying out the toner image fixing process.

As shown in FIG. 3, the fixing solution 36 is stored in a fixing solution tank 37, and, with the use of a coating roller 34 and a wire bar roller 35, acting as a fixing solution providing part, the fixing solution 36 is drawn up. At this time, the fixing solution 36 instantaneously enters recessions of a roughness prepared on the rollers, and spreads therein so that a thin layer state is produced. Then, the fixing solution 36 is provided to the toner 31 on the recording medium 22 as a result of being pressed by a pressing roller 33. The recording medium 22 such as paper has the toner 31 adhere thereto by the above-mentioned image forming process. The coating roller 34 is preferably made of a material superior in solvent resistance such as urethane rubber, fluororubber, silicone rubber or such. Other than the coating roller, an air spray, a solution drop jetting device such as an ink jet nozzle or such may be applied instead to provide the fixing solution to the toner.

After this coating process, gloss may be provided or fixing performance may be improved by additionally providing a pair of pressing rollers (hard rollers) 32. That is, with the use of the pressing rollers 32, a surface of the toner 31 is smoothed so that gloss is provided, or, the fixing performance is improved as a result of the toner being pressed into fibers of the recording medium 22.

Next, capsule structures according to the present invention are described with reference to FIGS. 4 and 5. The fixing solution may be provided to the toner in a form of the capsule structures.

Figure 4:
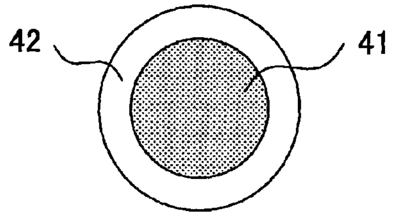
FIG. 4 shows one embodiment of a capsule structure according to the present invention.
Figure 5:
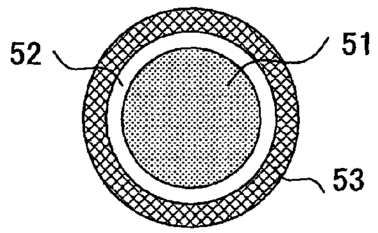
FIG. 5 shows another embodiment of a capsule structure according to the present invention.

As shown in FIG. 4, the capsule structure according to the present invention has a core agent 41 made of the fixing solution according to the present invention and an outer skin 42 made of a material insoluble with respect to the core agent 41. Thereby, the capsule structure generating reduced odor, and by which a toner can be rapidly fixed, can be provided.

It is preferable that, a configuration is provided such that the outer skin 42 should not be broken in a device for providing the capsule structure, and should be broken easily after it reaches the toner. An outer diameter of the capsule structure is preferably in a range between 5 and 50 μm, and, further preferably, in a range between 10 and 20 μm. A thickness of the outer skin is preferably in a range between 5 and 30% of the outer diameter of the capsule structure, and further preferably, in a range between 10 and 20% of the same.

As a material of the outer skin 42, a resin, a metal oxide material or such is preferable. The resin should be insoluble to the core agent 41. As the resin insoluble to the core agent 41, a cross-linked resin is also suitable. Specifically, polyethylene, polypropylene, polyurea resin, polyurethane resin, polyacrylonitrile, cross-linked methyl polymethacrylate, cross-linked polyvinyl alcohol or such may be applied. As the metal oxide, titanium oxide, magnesium oxide, silicon oxide or such may be applied. As a form of the outer skin 42, other than a film shape, a form such that fine particles are fixed to the core agent 41 in such a manner that the core agent 41 is prevented from oozing therefrom.

As another embodiment of a capsule structure according to the present invention, a capsule structure may have a core agent 51 made of a fixing solution according to the present invention, an inner skin 52 made of a material insoluble to the core agent 51, and an outer skin 53 made of solubility or a swelling property to the core agent 51. Thereby, the capsule structure generating reduced odor, and by which, a toner can be rapidly fixed, can be provided.

When the capsule structure shown in FIG. 4 is applied, the outer skin 42 is not dissolved and thus is left in the toner layer, after the toner is softened. This residual may cause image quality degradation such as increase in graininess in the toner image. However, when the outer skin 42 is reduced in thickness for the purpose of reducing the residual, a strength of the capsule structure may be degraded. Therefore, the structure shown in FIG. 5 is preferable in which the inner skin 52 is provided to cover the core agent 51 by a material insoluble to the core agent 51, as well as the outer skin 53 for covering the inner skin 52 made by a material having solubility or a swelling property to the core agent 51. By thus providing both the inner skin 52 and the outer skin 53, even though the material of the inner skin 52 is not dissolved and thus is left after the capsule structure is broken, the material of the outer skin 53 is dissolved or swelled by the core agent 51, and thus, is brought into the toner layer. Since a necessary strength of the capsule structure is provided by the outer skin 53, a thickness of the inner skin 52 can be reduced so that the residual, not being dissolved by the core agent 51, can be effectively reduced.

In a fixing method according to the present invention, the capsule structure according to the present invention described above may be provided to a recording medium having a toner, the capsule structure is broken, thereby the fixing solution is made to contact the toner, and therewith, the toner is fixed to the recording medium.

Figure 6:
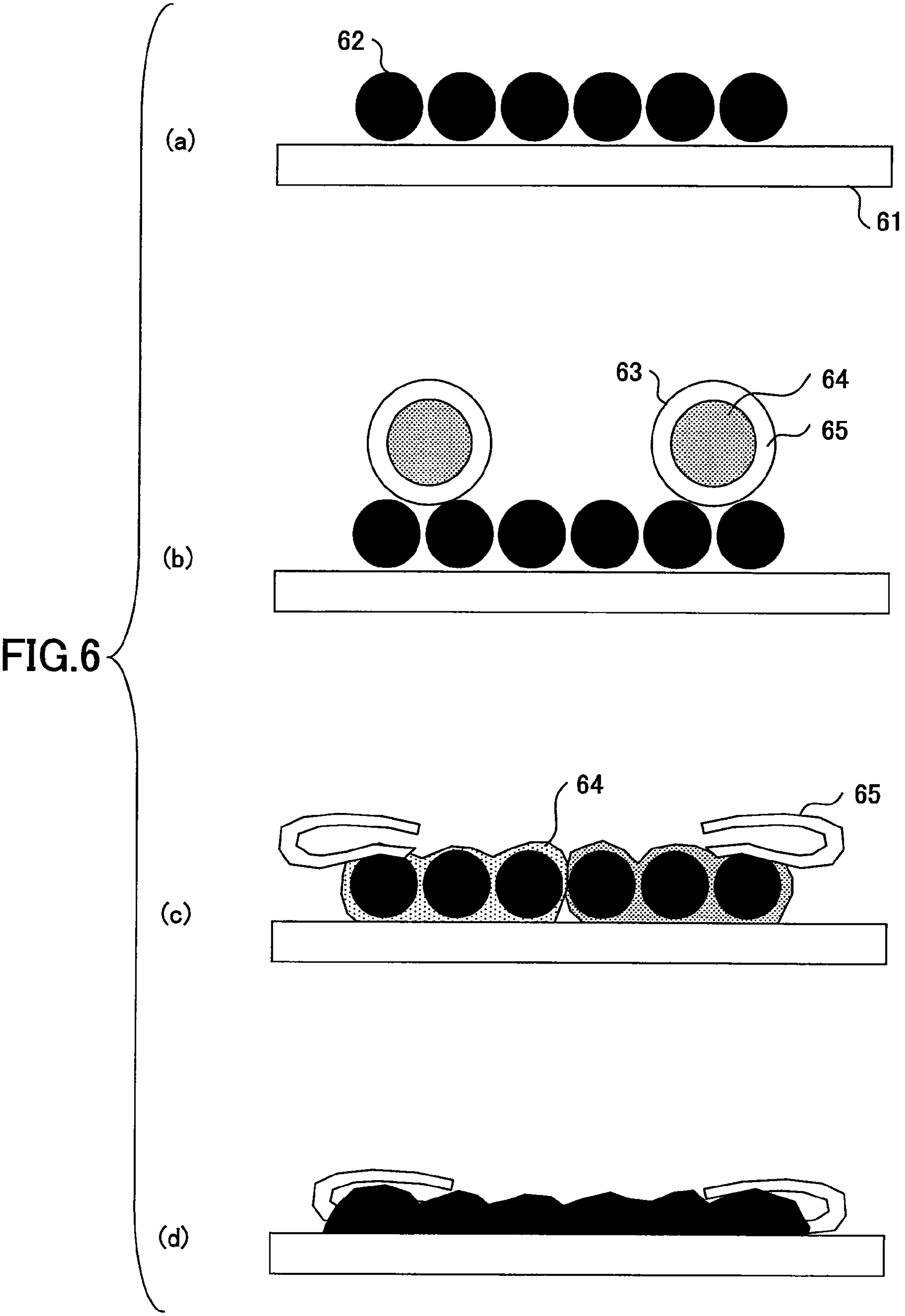
FIG. 6 shows one embodiment of a fixing method according to the present invention, and, (a), (b), (c) and (d) show a state in which a toner is not fixed; a state in which a capsule structure is provided; a state in which a capsule is broken; and a state in which the toner is fixed.

As shown in FIG. 6, the toner 62 is fixed through respective steps of providing the capsule structure 63 to the toner on the recording medium 61 (FIG. 6, (b)); breaking the capsule structure 63 and thus making the fixing solution 64, held in the capsule structure 63, to contact the toner 62 ((c)); and the fixing solution 64 softening the resin forming the toner 62, and thus fixing the toner 62 to the recording medium 61((*d*)). At this time, the outer skin 63 of the broken capsule structure 63 is not dissolved, and is left in the toner 62.

As a method of actually breaking the capsule structure 63, breaking by a pressure, breaking by a heat, breaking by ultrasonic wave vibration, or such, may be applied.

Other alternative embodiments of the fixing device according to the present invention, configured to process the above-described capsule structures, are described next with reference to FIGS. 7, 8 and 9.

Figure 7:
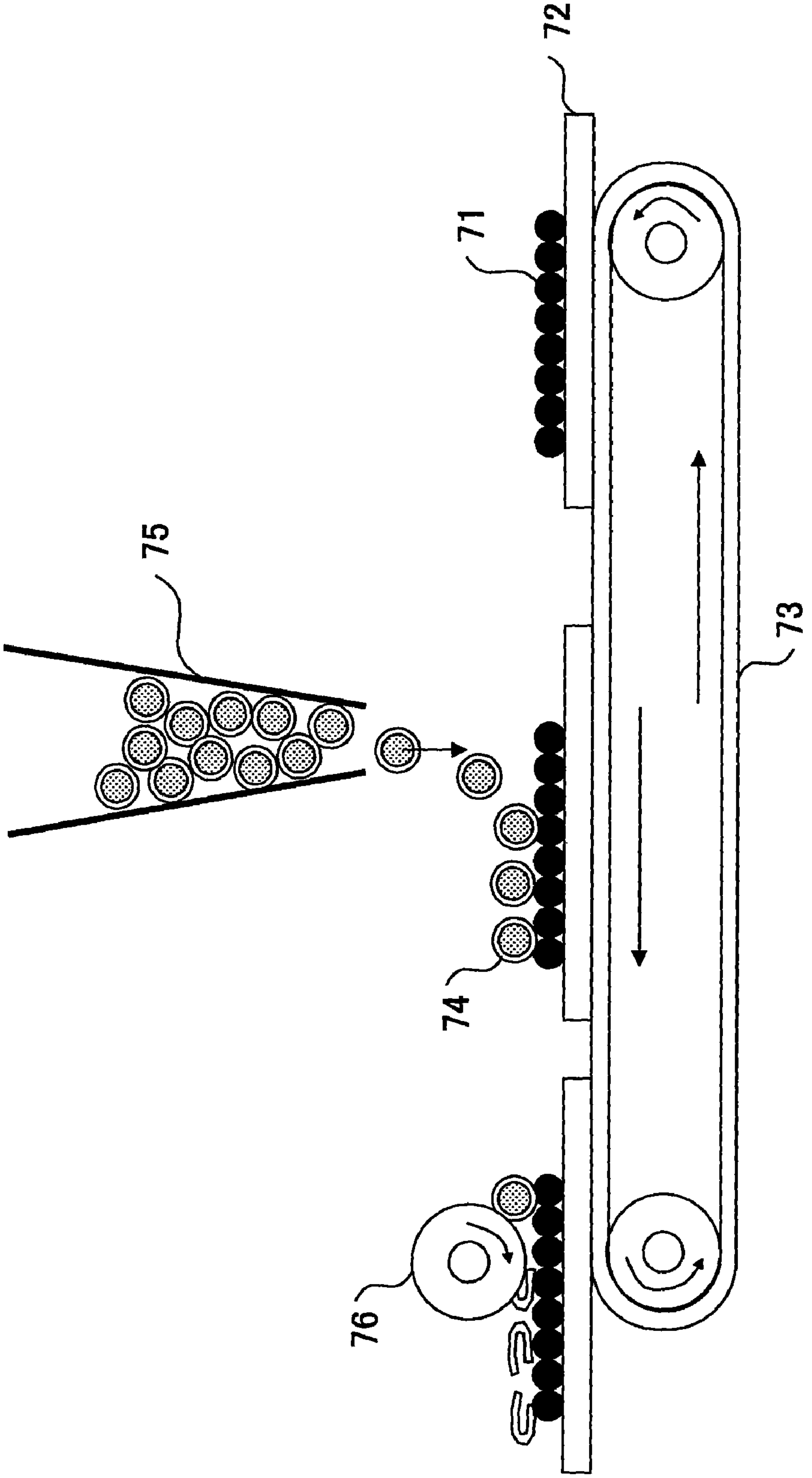
FIG. 7 shows one embodiment of a fixing method according to the present invention.
Figure 8:
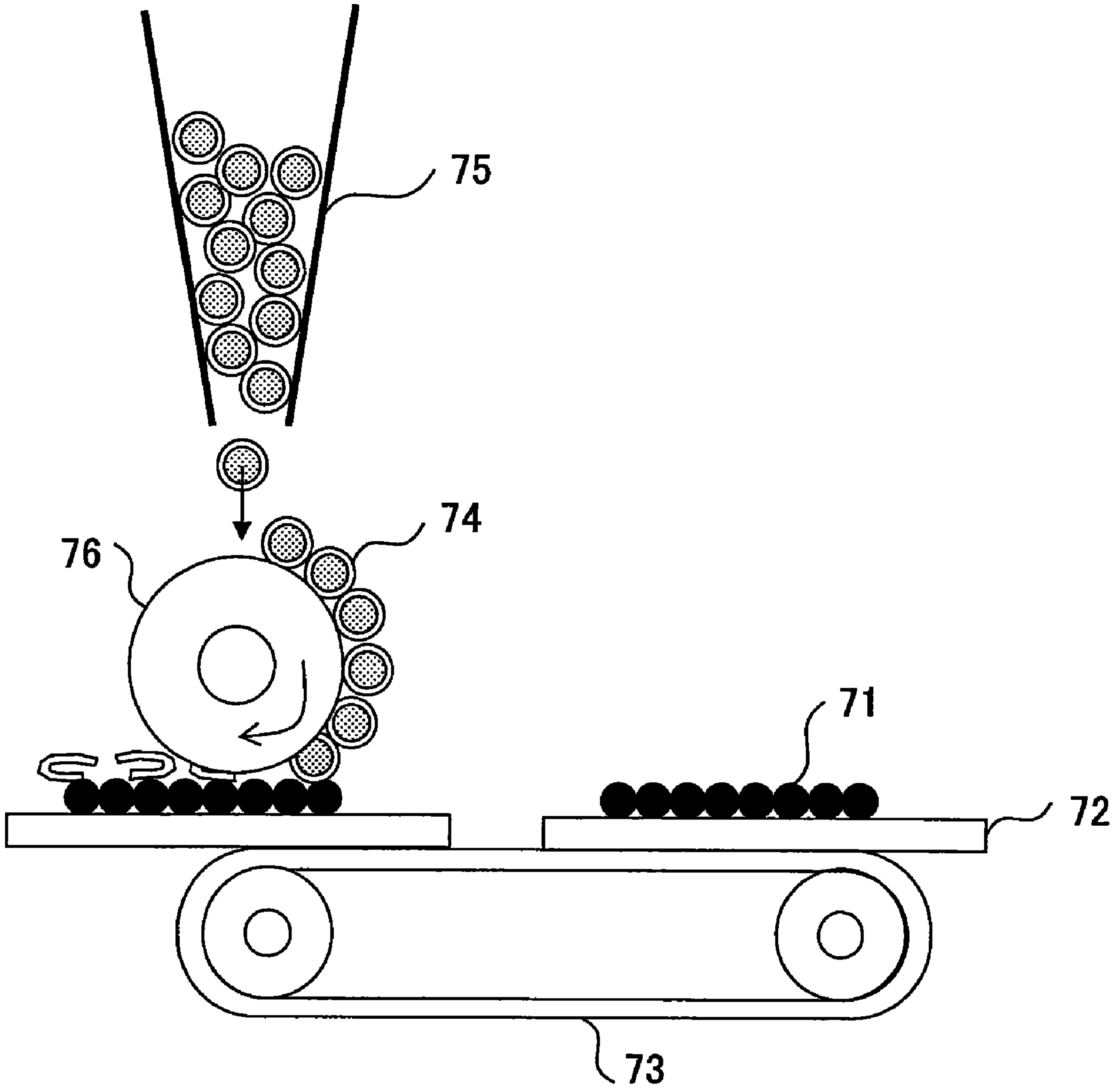
FIG. 8 shows another embodiment of a fixing method according to the present invention.
Figure 9:
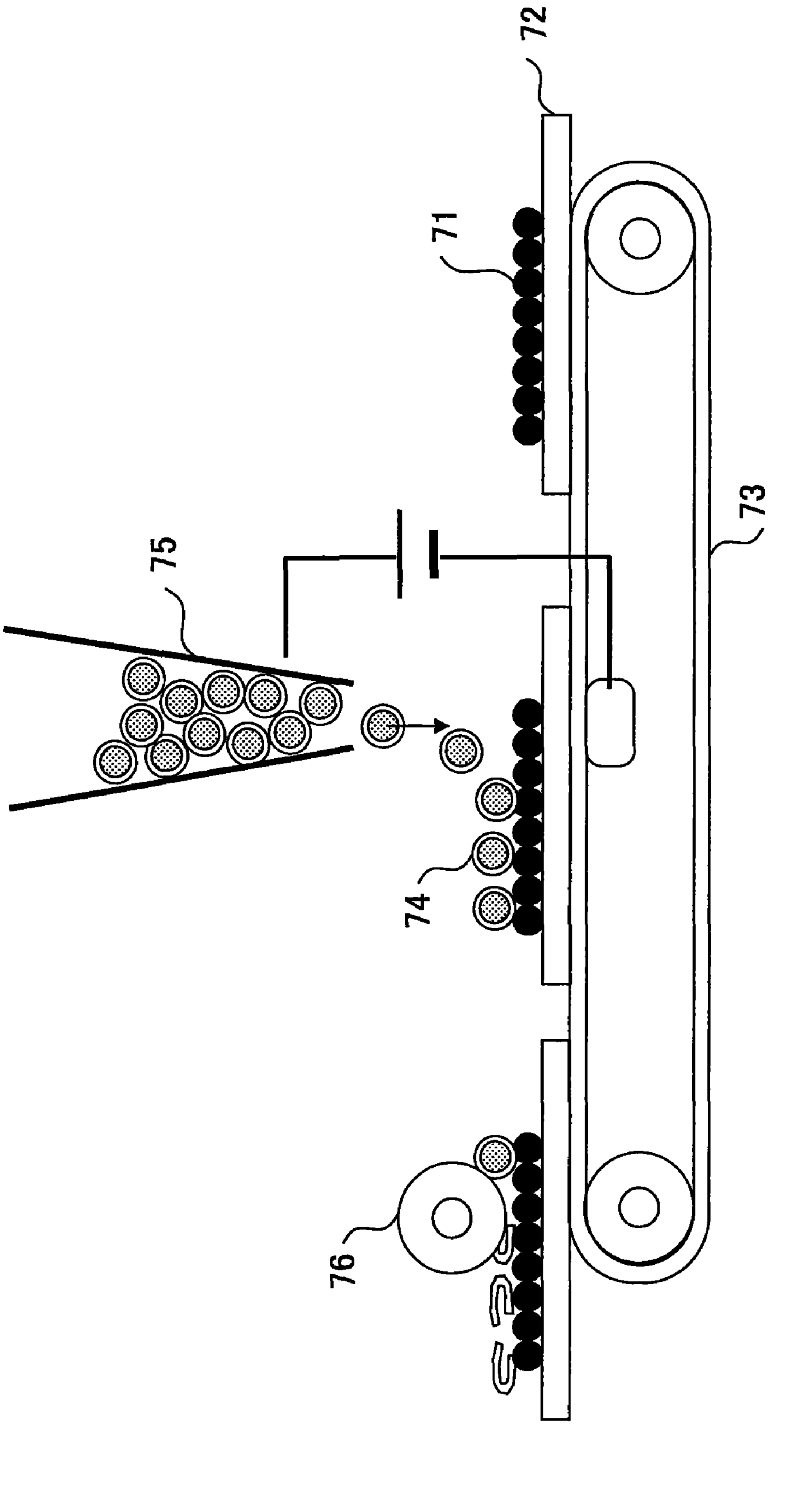
FIG. 9 shows another embodiment of a fixing method according to the present invention.

The fixing device, in an embodiment shown in each of FIGS. 7, 8 and 9, includes a device providing the capsule structures to the recording medium having the toner and a device breaking the capsule structures as mentioned above with reference to FIG. 6.

FIG. 7 shows one example of the fixing device. In this configuration, the recording medium 72 having the toner 71 is conveyed by a conveyance belt 73 from a right direction in the figure. A providing unit 75 for providing the capsule structures 74 is provided on the way of the conveyance belt 73, which provides a plurality of the capsule structures 74 to the recording medium 72. At a left end of the figure, a pressing roller 76 is provided, which breaks the capsule structures 74 by pressing them, and causes the fixing solution, held inside each capsule structure, to contact the toner 71, as in the step described above with reference to FIG. 6, (b) and (c).

As a method of providing the capsule structures 74 from the providing unit 75 to the recording medium 62, a method of gravity drop with a vibration, a method of pressurization jetting with pressurized air, a method of electrostatically sucking or such may be applied.

FIG. 8 shows another example of the fixing device. In this configuration, the capsule structures 74 are made to adhere to a pressing roller 76 from a providing unit 75, the capsule structures 74 are made to contact the recording medium 62, and at the same time, the capsule structures are broken as a result of being pressed by the pressing roller 76. By applying such a configuration, the device can be simplified. It is noted that, in order to making the capsule structures 74 to adhere to the pressing roller 76, a surface of the pressing roller 76 may have adherence.

A fixing device according to the present invention may have a device for providing the capsule structures selectively to the toner on the recording medium and a device breaking the capsule structures.

When the capsule structures 74 are provided to the entire area of the recording medium 72 in FIG. 7 or 8, a consumption amount of the capsule structures 74 increases, and thus, a running cost may increase. Therefore, according to a given image signal, or according to a detection signal of an image part optically detecting device, the capsule structures 74 are put selectively only on lines on which the toner 71 actually exists on the recording medium 72. For example, when an image is a character image or text image of horizontal writing, the capsule structures 74 are provided selectively only in proximity to each character image part by applying vibration to the providing unit 75 only when the character line on the recording medium 72 approaches the providing unit 75.

The fixing device according to the present invention may preferably further has a device electrically charging the capsule structures and providing them, and a device applying an electric field to the recording medium.

FIG. 9 shows one example of such a fixing device. In this configuration, configurations of a conveyance belt 73 and a pressing roller 76 are the same as those of FIG. 7 described above. A line type electrode is provided on a rear surface of the conveyance belt 73, and therewith, an electric field is applied between a projecting end of the providing unit 75 and the electrode provided on the rear surface of the conveyance belt 73. According to a given image signal, when a line of the toner 71 on the recording medium 72 approaches, an electric field is applied and the capsule structures 74 are provided selectively in proximity to the line of the toner 71. That is, by applying the electric field, the capsule structures 74 and the providing unit 75 are electrically charged in the same polarity, and the thus-charged capsule structures are led in a direction of the electrode provided on the rear surface of the conveyance belt 73 having the electrical charge of the polarity opposite to that of the providing unit 75.

By the above-described configuration, the fixing device and the fixing method, in which odor and hazardous problems are solved, and by which superior fixing performance is provided without the use of a heat, can be provided.

Further specific embodiments as well as comparison examples of the fixing solution and the capsule structure, as well as the fixing method and the fixing device according to the first through fourteenth aspects of the present invention are described next. It is noted that the embodiments merely exemplify the present invention, and the present invention is not limited thereto.

An embodiment 1 of the present invention is described.

In the embodiment 1, a transparent fixing solution was produced as a result of 5 weight % of hexyl laureate (softener; $LD_{50}$=8 g/kg) and 95 weight % of dimethylsiloxane (solvent; 1 mPa·s, $LD_{50}$=15 g/kg) being mixed and stirred. A fixing part of a printer Ipsio CX6100 (made by Ricoh Co., Ltd.) was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 1, an odor index of the solution was 0, and an odor index of the fixing solution was 0. Further, no unpleasant odor was generated in an office when the toner image was fixed.

An embodiment 2 of the present invention is described.

In the embodiment 2, a transparent fixing solution was produced as a result of 10 weight % of isopropylmyristate (softener; $LD_{50}$=8 g/kg) and 90 weight % of dimethylsiloxane being mixed and stirred. A fixing part of a printer Ipsio CX6100 (made by Ricoh Co., Ltd.) was not heated, and the fixing solution was coated with the use of a coating device shown in FIG. 3 on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 0, an odor index of the solution was 0, and an odor index of the fixing solution was 0. Further, no unpleasant odor was generated in an office when the toner image was fixed.

An embodiment 3 of the present invention is described.

In the embodiment 3, a transparent fixing solution was produced as a result of 7 weight % of ethyl laureate (softener; $LD_{50}$=3 g/kg) and 93 weight % of n-hexane (solvent; $LD_{50}$=28.7 g/kg) being mixed and stirred. A fixing part of a printer Ipsio CX6600 (made by Ricoh Co., Ltd.) was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 13, an odor index of the solution was 0, and an odor index of the fixing solution was 10. Further, no unpleasant odor was generated in an office when the toner image was fixed.

An embodiment 4 of the present invention is described.

In the embodiment 4, a transparent fixing solution was produced as a result of 5 weight % of dibutylsebacate (softener; $LD_{50}$=14.9 g/kg) and 95 weight % of hydrofluoroether (solvent; $LD_{50}$>5 g/kg) being mixed and stirred. A fixing part of a printer Ipsio CX6600 (made by Ricoh Co., Ltd.) was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 3, an odor index of the solution was 2, and an odor index of the fixing solution was 2. Further, no unpleasant odor was generated in an office when the toner image was fixed.

An embodiment 5 of the present invention is described.

In the embodiment 5, a transparent fixing solution was produced as a result of 4 weight % of isobutyladipate (softener; $LD_{50}$=12.3 g/kg) and 96 weight % of dimethylsiloxane being mixed and stirred. A fixing part of a printer Ipsio CX6600 (made by Ricoh Co., Ltd.) was not heated, and the fixing solution was coated with the use of a coating device shown in FIG. 3 on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 3, an odor index of the solution was 0, and an odor index of the fixing solution was 0. Further, no unpleasant odor was generated in an office when the toner image was fixed.

An embodiment 6 of the present invention is described.

In the embodiment 6, a transparent fixing solution was produced as a result of 10 weight % of diethoxy ethyl succinate (softener; $LD_{50}$=5 g/kg) and 90 weight % of hydrofluoroether being mixed and stirred. A fixing part of a printer Ipsio CX6600 (made by Ricoh Co., Ltd.) was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 1, an odor index of the solution was 0, and an odor index of the fixing solution was 0. Further, no unpleasant odor was generated in an office when the toner image was fixed.

An embodiment 7 of the present invention is described.

In the embodiment 7, a transparent fixing solution was produced as a result of 2 weight % of ethyllaurate, 97 weight % of water (solvent) and 1 weight % of sucrose laurate ester (detergent; HLB value=16) being mixed and stirred. A fixing part of a printer LaserJet 3500 (made by Hewlett Packard Company) was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 3, an odor index of the solution was 0, and an odor index of the fixing solution was 0. Further, no unpleasant odor was generated in an office when the toner image was fixed.

An embodiment 8 of the present invention is described.

In the embodiment 8, a transparent fixing solution was produced as a result of 4 weight % of diisobutyladipate, 20 weight % of ethanol (solvent; $LD_{50}$=20 g/kg), 75 weight % of water and 1 weight % of sucrose laurate ester being mixed and stirred. A fixing part of a printer Ipsio CX6600 was not heated, and the fixing solution was coated with the use of a carting device shown in FIG. 3 on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, odor index of the softener was 1, odor index of the solution was 0, and odor index of the fixing solution was 0. Further, no unpleasant odor was generated in an office when the toner image was fixed. Further, after the fixing solution was put in a closed vessel and was stored for one month at 50° C., neither decomposition nor separation occurred in the diisobutyladipate and performance of the fixing solution was satisfactory.

An embodiment 9 of the present invention is described.

In the embodiment 9, a transparent fixing solution was produced as a result of 9 weight % of diethoxyethyl succinate, 90 weight % of water and 1 weight % of sucrose laurate ester being mixed and stirred. A fixing part of a printer Ipsio CX6600 was not heated, and the fixing solution was spread and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adheres to the waste, and the toner was fixed to the paper. Further, an odor index of the softener was 1, an odor index of the solution was 0, and an odor index of the fixing solution was 0. Further, no unpleasant odor was generated in an office when the toner image was fixed. Further, after the fixing solution was put in a closed vessel and was stored for one month at 50° C., neither decomposition nor separation occurred in diethoxyethyl succinate and performance of the fixing solution was satisfactory.

An embodiment 10 of the present invention is described.

In the embodiment 10, a transparent fixing solution was produced as a result of 10 weight % of diethoxyethyl succinate, 10 weight % of ethanol, 79 weight % of water and 1 weight % of nonionic detergent being mixed and stirred. A fixing part of a printer Ipsio CX6600 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 1, an odor index of the solution was 0, and an odor index of the fixing solution was 0. Further, no unpleasant odor was generated in an office when the toner image was fixed. Further, after the fixing solution was put in a closed vessel and was stored for one month at 50° C., neither decomposition nor separation occurred in diethoxyethyl succinate and performance of the fixing solution was satisfactory.

A comparison example 1 is described next.

In the comparison example 1, an emulsified fixing solution was produced as a result of 2 weight % of isobutyl palmitate (softener; $LD_{50}$=8 g/kg), 97 weight % of water and 1 weight % of sucrose laurate ester being mixed and stirred. A fixing part of a printer Ipsio CX6600 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 20 seconds later, the toner hardly adhered to the paper, and the toner stuck to the waste.

A comparison example 2 is described.

In the comparison example 2, an emulsified fixing solution was produced as a result of 2 weight % of isopropyl palmitate (softener; $LD_{50}$=8 g/kg), 97 weight % of water and 1 weight % of sucrose laurate ester being mixed and stirred. A fixing part of a printer LaserJet 3500 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 20 seconds later, the toner hardly adhered to the paper, and the toner stuck to the waste.

A comparison example 3 is described next.

In the comparison example 3, an emulsified fixing solution was produced as a result of 2 weight % of methylcaprylate (softener; $LD_{50}$=3 g/kg), 97 weight % of water and 1 weight % of sucrose laurate ester being mixed and stirred. A fixing part of a printer Ipsio CX6600 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 20 seconds later, no toner adhered to the waste, and the toner was firmly fixed to the paper. However, an odor index of the softener was 13, an odor index of the solution was 0, and an odor index of the fixing solution was 11. As a result, rancid acid odor hanged in an office when the toner image was fixed.

A comparison example 4 is described next.

In the comparison example 4, an emulsified fixing solution was produced as a result of 5 weight % of isobutyladipate, 94 weight % of water and 1 weight % of nonionic detergent being mixed and stirred. A fixing part of a printer Ipsio CX6600 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 20 seconds later, the toner was fixed to the paper to some extent, but the toner also adhered to the waste. Further, after the fixing solution was put in a closed vessel and was stored for one month at 50° C., phase separation occurred between isobutyladipate and water, and performance of the fixing solution degraded.

A comparison example 5 is described next.

In the comparison example 5, an emulsified fixing solution was produced as a result of 10 weight % of diethoxyethyl succinate, 79 weight % of water and 1 weight % of nonionic detergent being mixed and stirred. A fixing part of a printer Ipsio CX6600 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 20 seconds later, the toner was fixed to the paper to some extent, but the toner also adhered to the waste. Further, after the fixing solution was put in a closed vessel and was stored for one month at 50° C., phase separation occurred between diethoxyethyl succinate and water, and performance of the fixing solution degraded.

An embodiment 11 is described next.

In the embodiment 11, 10 weight % of diisobutyladipate, 51 weight % of dimethylsiloxane, 27 weight % of ethyl acetate and 12 weight % of di-isocyanate compound, Sumidule L (provided by Sumitomo-Bayer urethane Co., LTD.) were stirred for 30 minutes with the use of a stirrer. Thus, a dispersion A1 was obtained.

Further, 5 weight % of hydroxypropyl cellulose was added to 95 weight % of water at 70° C., stirring was carried out for 10 minutes, after that cooling was carried out to 10° C. while stirring was carried out for 30 minutes, and thus, a dispersion B was obtained.

Next, while a homogenizer (made by Tokushu Kika Kogyo Co., Ltd.) was applied to stir 200 g of the dispersion B, 100 g of the dispersion A1 was dropped therein, and thus, an O/W type emulsion was produced. At this time, a mean volume particle diameter of the emulsion was approximately 30 μm. Next, while a propeller type stirrer was applied to stir the emulsion, 5 weight % of ethylene triamine water solution was dropped to the amount of 100 g. While this emulsion was stirred for 3 hours at 70° C., and superfluous ethyl acetate was evaporated, a capsule, having a core agent including diisobutyladipate and dimethylsiloxane, and an outer skin including an urea resin, was produced. After hydroxypropyl cellulose as a dispersant and unreacted ethylene triamine were removed with the use of a large quantity of water, drying was carried out, and thus, the capsules were obtained. Further, hydrophobic silica fine particles were made to adhere to the capsule surfaces. An average outer diameter of the thus-obtained capsule was approximately 20 μm.

A fixing part of a color copier, Ipsio Color C240 (made by Ricoh Co., Ltd.) was not heated, the capsules were provided by a brush to the entire surface of a PPC paper on which a black solid image of 2 cm by 2 cm was produced, the paper was then made to pass between two metal pressing rollers with a load of 50 kg applied at both ends, at 20 mm/s in linear velocity, and after 5 seconds, a waste was applied to rub the image surface. As a result, the image was not distorted, no toner adhered to the waste, and the toner image was fixed to the paper.

An embodiment 12 is described next.

In the embodiment 12, 10 weight % of diethoxyethyl succinate, 51 weight % of n-dodecane (solvent; $LD_{50}$=20 g/kg), 27 weight % of ethyl acetate and 12 weight % of Sumidule L were stirred for 30 minutes with the use of a stirrer. Thus, a dispersion A2 was obtained.

Next, while a homogenizer (made by Tokushu Kika Kogyo Co., Ltd.) was applied to stir 200 g of the above-mentioned dispersion B, 100 g of the dispersion A2 was dropped therein, and thus, an O/W type emulsion was produced. At this time, a mean volume particle diameter of the emulsion was approximately 30 μm. Next, while a propeller type stirrer was applied to stir the emulsion, 5 weight % of ethylene triamine water solution was dropped to the amount of 100 g. While this emulsion was stirred for 3 hours at 70° C., and superfluous ethyl acetate was evaporated, a capsule, having a core agent including diethoxyethyl succinate and n-dodecane, and an outer skin including an urea resin, was produced. After hydroxypropyl cellulose as a dispersant and unreacted ethylene triamine were removed with the use of a large quantity of water, drying was carried out, and thus, the capsules were obtained. Further, hydrophobic silica fine particles were made to adhere to the capsule surfaces. An average outer diameter of the thus-obtained capsule was approximately 20 μm.

A fixing part of a color copier, Ipsio Color C240 was not heated, the capsules were provided by a brush to the entire surface of a PPC paper on which a black solid image of 2 cm by 2 cm was produced, the paper was then made to pass between two metal pressing rollers with a load of 50 kg applied at both ends, at 20 mm/s in linear velocity, and after 5 seconds, a waste was applied to rub the image surface. As a result, the image was not distorted, no toner adhered to the waste, and the toner image was fixed to the paper.

An embodiment 13 is described next.

The capsules were produced in the same manner as that of the above-described embodiment 11.

A configuration of a fixing device is shown below. In FIG. 7, an endless belt made of a PET film was applied as the conveyance belt 73, and a distance between driving rollers was set in 500 mm. The providing unit 75 was configured such that two plates made by stainless steel with a thickness of 0.5 mm had an angle of 30° therebetween, and PET films were applied to cover side surfaces. An opening between the two plates was adjusted in a width of 50 μm. In order to provide the capsules, a mechanical vibration mechanism was provided to one plate (not shown in FIG. 7). By vibrating the one plate at an appropriate timing, the capsules were provided to a toner surface. An iron roller having a surface plated with chrome was applied as the pressing roller 76, and adjustment was made such that a load of 50 kg was applied at both ends. The conveyance belt 73 was driven at a linear velocity of 20 mm/s.

A fixing part of a printer, Ipsio CX6600 was not heated, a PPC paper on which a black solid image of 2 cm by 2 cm as a not-yet-fixed image was produced was made to pass through the above-described fixing device, and then, a waste was applied to rub the image surface after 5 seconds. As a result, the image was not distorted, no toner adhered to the waste, and the toner image was fixed to the paper.

An embodiment 14 is described next.

The capsules were produced in the same manner as that of the above-described embodiment 11.

A configuration of a fixing device is shown below. In FIG. 8, an endless belt made of a PET film was applied as the conveyance belt 73, and a distance between driving rollers was set in 300 mm. The providing unit 75 was configured such that two plates made by stainless steel with a thickness of 0.5 mm had an angle of 30° therebetween, and PET films were applied to cover side surfaces. An opening between the two plates was adjusted in a width of 50 μm. In order to provide the capsules, a mechanical vibration mechanism was provided to one plate (not shown in FIG. 8). By vibrating the one plate at an appropriate timing, the capsules were provided to the pressing roller 76. An iron roller having a surface with silicone rubber coated thereto was applied as the pressing roller 76, and adjustment was made such that a load of 30 kg was applied at both ends. The conveyance belt 73 was driven at a linear velocity of 20 mm/s.

A fixing part of a printer, Ipsio CX6600 was not heated, a PPC paper on which a black solid image of 2 cm by 2 cm as a not-yet-fixed image was produced was made to pass through the above-described fixing device, and then, a waste was applied to rub the image surface after 5 seconds. As a result, the image was not distorted, no toner adhered to the waste, and the toner image was fixed to the paper.

An embodiment 15 is described next.

The capsules were produced in the same manner as that of the above-described embodiment 11.

A configuration of a fixing device is shown below. In FIG. 9, an endless belt made of a PET film was applied as the conveyance belt 73, and a distance between driving rollers was set in 500 mm. The providing unit 75 was configured such that two plates made by brass with a thickness of 0.5 mm had an angle of 30° therebetween, and PET films were applied to cover side surfaces. An opening between the two plates was adjusted in a width of 50 μm. In order to provide the capsules, a counter electrode made by brass with a thickness of 3 mm was provided on the side of the endless belt, and the counter electrode was connected to a power pack, so that a voltage of 1.5 kV could be applied. A distance between the conveyance belt 73 and the projecting end of the providing unit 75 was set in 10 mm. In this configuration, capsules were provided to a toner surface in such manner that, no voltage was applied for a non-image part according to given image information. An iron roller having a surface plated with chrome was applied as the pressing roller 76, and adjustment was made such that a load of 50 kg was applied at both ends. The conveyance belt 73 was driven at a linear velocity of 20 mm/s.

A fixing part of a printer, Ipsio CX6600 was not heated, a PPC paper on which a black solid image of 2 cm by 2 cm as a not-yet-fixed image was produced was made to pass through the above-described fixing device, and then, a waste was applied to rub the image surface after one minute. As a result, the image was not distorted, no toner adhered to the waste, and the toner image was fixed to the paper.

An embodiment 16 is described next.

In the embodiment 16, 19 weight % of capsules obtained from the above-described embodiment 11, 18 weight % of polystyrene Piccolastic D125 (made by Rika-Hercules Co., Ltd.) and 73 weight % of toluene were stirred for 30 minutes, and thus, a dispersion C1 was obtained.

Further, a dispersion D was obtained as a result of 98 weight % of water and 2 weight % of nonionic detergent being stirred by a stirrer for 10 minutes.

Next, while a homogenizer was applied to stir 200 g of the above-mentioned dispersion D, 50 g of the dispersion C1 was dropped therein, and thus, an O/W type emulsion was produced. Next, while a stirrer was applied to stir the emulsion, toluene was evaporated at 60° C., and a capsule, having a core agent including diisobutyladipate and dimethylsiloxane, an inner skin including an urea resin and an outer skin including polystyrene was produced. When a scanning electron microscope (SEM) was applied to observe a sectional view of the capsule, this capsule had an outer diameter of 30 μm, 4 μm in a thickness of the outer skin, and 0.5 μm in a thickness of the inner skin.

A fixing part of a color copier, Ipsio Color C240 was not heated, the capsules were provided by a brush to the entire area of a PPC paper on which a black solid image of 2 cm by 2 cm as a not-yet-fixed toner image was produced, the paper was then made to pass between two metal pressing rollers with a load of 50 kg applied at both ends, at 20 mm/s in linear velocity, and after 5 seconds, a waste was applied to rub the image surface. As a result, the image was not distorted, no toner adhered to the waste, and the toner image was fixed to the paper. Further, from observation with the microscope, no resin scraps were observed on the fixed toner surface, and the thus-obtained image was satisfactory without graininess.

Next, embodiments according to the above-mentioned fifteenth through thirty-seventh aspects of the present invention are described.

First, a wet-type electrophotographic copier (simply referred to as a copier 1200, hereinafter) as an image forming apparatus in one embodiment according to the present invention is described. For the present embodiment, a case where a full color image is produced with the use of four color toners of yellow, magenta, cyan and black (simply referred to as Y, M, C and Bk, respectively, hereinafter) is described.

Figure 10:
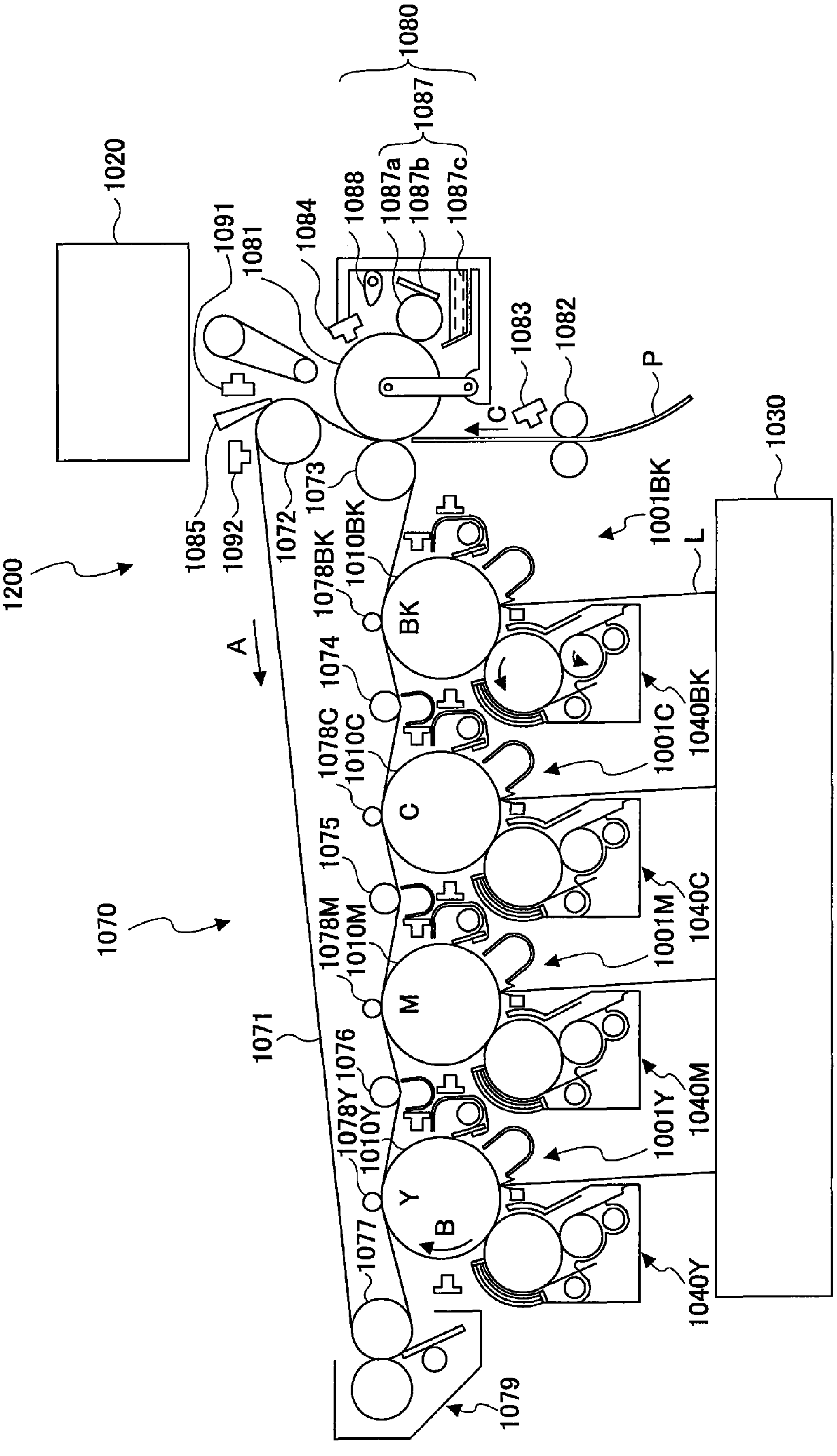
FIG. 10 shows a general configuration diagram of a copier according to one embodiment of the present invention.

FIG. 10 shows a general configuration of the copier 1200. This copier 1200 includes four image forming units 1001Y, 1001M, 1001C and 100Bk. Further, the copier 1200 includes a laser writing unit 1030 as a latent image producing part emitting laser light L; an intermediate transfer unit 1070; a secondary transfer unit 1080 as a secondary transfer part; a fixing device 1020 as a fixing part; an image reading device; a paper feeding part; a control part and so forth, not shown. It is noted that, the four image forming units 1001Y, 1001M, 1001C and 1001Bk have the same configurations, and therefore, description is made below only for the Y image forming unit 1001Y using the Y toner.

Figure 11:
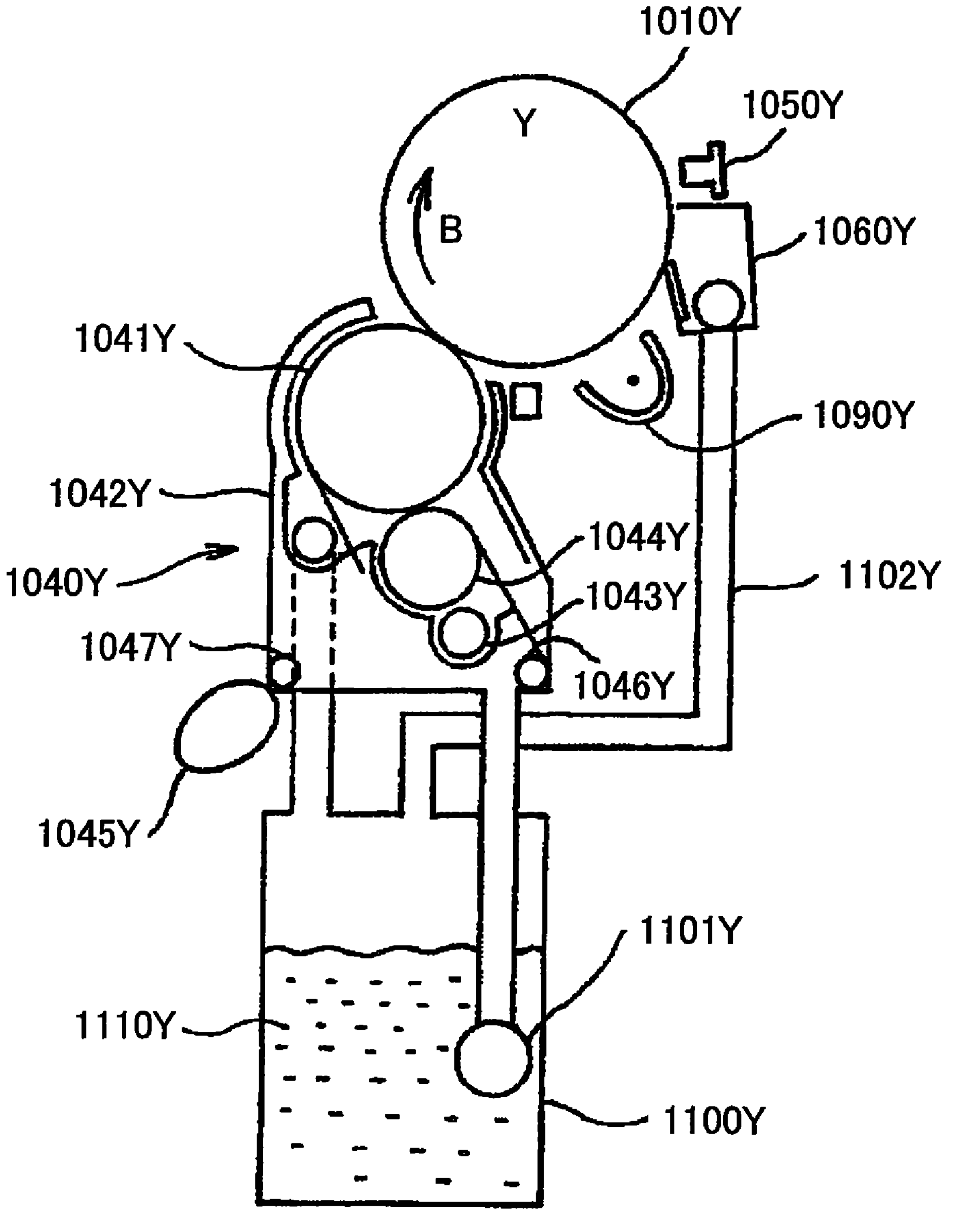
FIG. 11 shows a general configuration of a Y-developing device in the copier shown in FIG. 10.

FIG. 11 shows a general configuration of the Y image forming unit 1001Y. This Y image forming unit 1001Y includes a photosensitive drum 1010Y as a latent image carrier; a charging unit 1090Y as a uniform charging part; and a liquid developing device 1040Y as a developing part. Further, the Y image forming unit 1010Y includes an electricity removing device 1050Y as an electricity removing part; a photosensitive drum cleaning device 1060Y as a cleaning part applying a clearing blade; and a developer containing tank 1100Y containing a Y liquid developer 1110Y. The liquid developing device 1040Y has a devolving roller 1041Y, a developer tank 1042Y holding the liquid developer 1110Y and a developer drawing roller 1043Y disposed to be immersed in the liquid developer 1110Y in the developer tank 1042Y. Further, a developer coating roller 1044Y causing the liquid developer drawn by the developer drawing roller 1043Y to be a thin film and coating it to the developing roller 1041Y is provided. In the liquid developer 1110Y, toner particles, which are developing particles, are dispersed in a high concentration in a carrier solution which is a solvent nonvolatile, or approximately nonvolatile, and having insulating properties. The liquid developer 1110Y has viscosity in a range between 100 and 10000 [mPa·s:]. The toner particles are electrically charged in a positive polarity.

This liquid developing device 1040Y has a contacting/retreating mechanism including a cam 1045Y for causing the developing roller 1041Y to contact or retreat from the photosensitive drum 1010Y, and thus, is configured to rotate about a shaft 1046Y counterclockwise in the figure. A cam receiver 1047Y is pressed by a spring (not shown) counterclockwise in the figure in a tangential direction of a circle having a center in the shaft 1046Y, and, at a time of developing, the state shown in FIG. 11 is kept by the function of the cam 1045Y.

The liquid developer 1110Y held by the developer containing tank 1100Y is drawn by a resupply pump 1101Y, and is provided to the developer tank 1042Y of the liquid developing device 1040Y. Further, a residual developer left on the photosensitive drum 1010Y without being primarily transferred is collected by the photosensitive drum cleaning device 1060Y, and then, is returned to the developer containing tank 1100Y via a collecting path 1102Y. The thus-collected residual developer is mixed with the liquid developer held in the developer containing tank 1100Y, and is provided to the developer tank 1042 by the resupply pump 1101Y.

The intermediate transfer unit 1070 shown in FIG. 10 has an intermediate transfer belt 1071 as an intermediate transfer member, puling rollers 1072, 1073, 1074, 1075, 1076 and 1077 stretching the intermediate transfer belt 1071. Furthermore, a primary transfer bias roller 1078Y, 1078M, 1078C and 1078Bk as primary transfer bias generating parts, and a belt cleaning device 1079 as an intermediate transfer member cleaning device having a cleaning blade are provided.

The intermediate transfer belt 1071 is stretched by the stretching rollers 1072, 1073, 1074, 1075, 1076 and 1077 and the respective photosensitive drums 1010Y, 1010M, 1010C and 1010Bk, and thus, is stretched to have a predetermined tensile force. Thus, the intermediate transfer belt 1071 carries out surface migration in a direction A shown in FIG. 10. Further, the respective primary toner bias rollers 1078Y, 1078M, 1078C and 1078Bk are disposed to face the photosensitive drums 1010Y, 1010M, 1010C and 1010Bk via the intermediate transfer belt 1071, respectively. These primary toner bias rollers 1078Y, 1078M, 1078C and 1078Bk have predetermined primary biases applied thereto by a primary transfer power source not shown.

Figure 12:
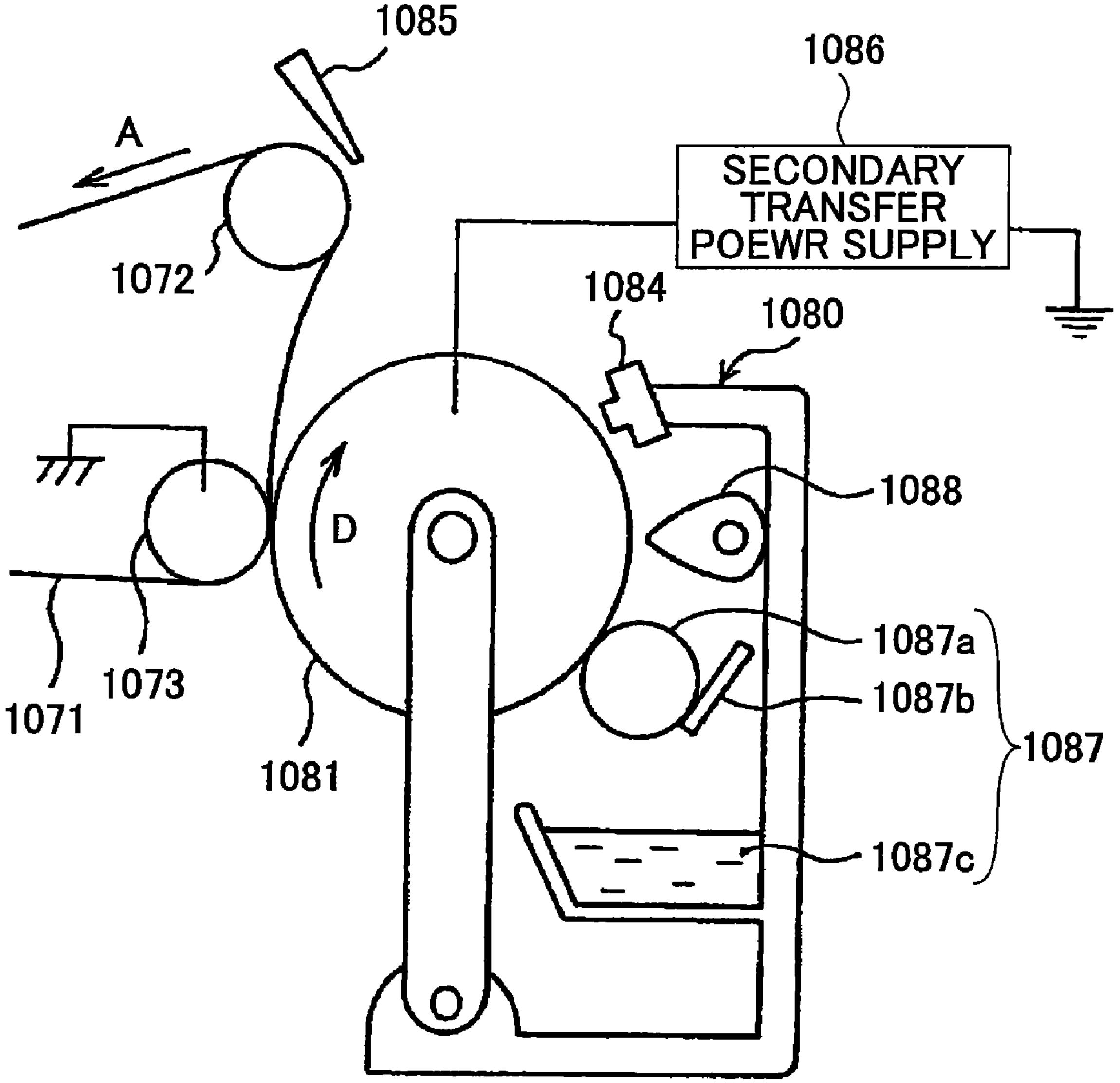
FIG. 12 shows a general configuration diagram of a secondary transfer unit of the copier shown in FIG. 10.

FIG. 12 shows a general configuration of the secondary transfer unit 1080. This secondary transfer unit 1080 includes a secondary transfer bias roller 1081 as a secondary transfer member, and a secondary transfer power source 1086 as a bias applying part connected with the secondary transfer bias roller 1081. Further, a roller cleaning device 1087 as a cleaning part cleaning a surface of the secondary bias roller 1081, and a contacting/retreating mechanism 1088 as a contacting/retreating part are provided.

The secondary transfer bias roller 1081 is configured to have a smooth surface of not more than 3 μm in ten-point average roughness Rz prescribed in JIS. This secondary transfer bias roller 1081 is disposed to face the stretching roller 1073 of the intermediate transfer unit 1070, acts as the secondary transfer bias generating part together with the secondary transfer power source 1086, and generates a secondary transfer bias between the intermediate transfer belt 1071 and itself. Further, the secondary bias power source 1086 applies a bias, which is controlled to provide a constant electric current, to the secondary transfer bias roller 1081.

Next, image forming operation of the copier 1200 is described. In the copier 1200, as shown in FIG. 11, after the photosensitive drum 1010Y is driven and rotated in a direction B, and is electrically charged uniformly by the charger 1090Y, a Y electrostatic latent image is produced on the photosensitive drum 1010Y as a result of laser light L being applied thereto by the laser writing device 1030. On the other hand, the liquid developer 1110Y adhering to the developer drawing roller 1043Y immersed in the liquid developer in the developer containing tank 1042Y is then coated to the developing roller 1041Y by means of the developer coating roller 1044Y in a thickness of, for example, on the order of a range between 0.5 and 20 μm. Then the developing roller 1041Y is made to contact the photosensitive drum 1010Y, and thus, the Y latent image produced on the surface of the photosensitive drum 1010Y is developed by the toner included in the liquid developer 1110Y in an inverted developing manner. When developing is carried out, a predetermined developing bias is applied between the developing roller 1041Y and the photosensitive drum 1010Y, so that the toner on the developing roller 1041Y moves in the carrier solution, and electrostatically adheres to the Y electrostatic latent image on the photosensitive drum 1010Y.

The Y toner image produced through the developing is conveyed to a Y primary transfer part at which the photosensitive drum 1010Y contacts the intermediate transfer belt 1071, along with rotation of the photosensitive drum 1010Y. At this primary transfer part, a negative bias voltage, for example, in a range between −300 and −500 V is applied by the primary toner bias roller 1078Y to a rear surface of the intermediate transfer belt 1071. A primary transfer electric field generated by this bias voltage results in attracting the toner image from the photosensitive drum 1010Y to the intermediate transfer belt 1071. Thus, the toner image is primarily transferred to the intermediate transfer belt 1071. In the same manner, an M toner image, a C toner image and a Bk toner image are primarily transferred to the intermediate transfer belt 1071 in a manner such that these respective toner images are overlaid on the Y toner image in sequence.

The toner images thus overlaid on the intermediate transfer belt 1071 for the four colors as described above are conveyed to a secondary transfer part facing the secondary transfer bias roller 1081 along with rotation of the intermediate transfer belt 1071. Further, to this secondary transfer part, a transfer paper P as a recording medium is conveyed from a direction of an arrow C of FIG. 10 at a predetermined timing by means of a registration roller 82. The secondary transfer bias roller 1081 contacts the intermediate-transfer belt 1071 by means of the contacting/retreating mechanism 1088 at a predetermined timing, and has a negative bias voltage, for example, in a range between −800 and −2000 V applied thereto by the secondary transfer power source 1086. Then, a secondary transfer electric field generated by this negative bias voltage and a contacting pressure result in attracting the toner images from the intermediate transfer belt 1071 to the transfer power P. As a result, the toner images are secondarily transferred to the transfer paper P together.

After that, the transfer paper P to which the toner images are thus secondarily transferred is removed from the intermediate transfer belt 1071 by means of a removing device 1085, undergoes fixing processing by means of the fixing device 1020, and then, is ejected from the apparatus body. On the other hand, the photosensitive drum 1010Y, after having the primary transfer carried out therefrom, has a residual electric charge removed therefrom by means of the electricity removing device 1050Y, has the surface cleaned by the cleaning device 1060Y, thus has a residual developer removed therefrom and collected, and thus, is prepared for a subsequent image forming operation. Further, the intermediate transfer belt 1071 after having the secondary transfer carried out therefrom, has the surface cleaned by the belt cleaning device 1079 shown in FIG. 10, a residual developer removed and collected therefrom, and thus, is also prepared for the subsequent image forming operation.

Figure 13:
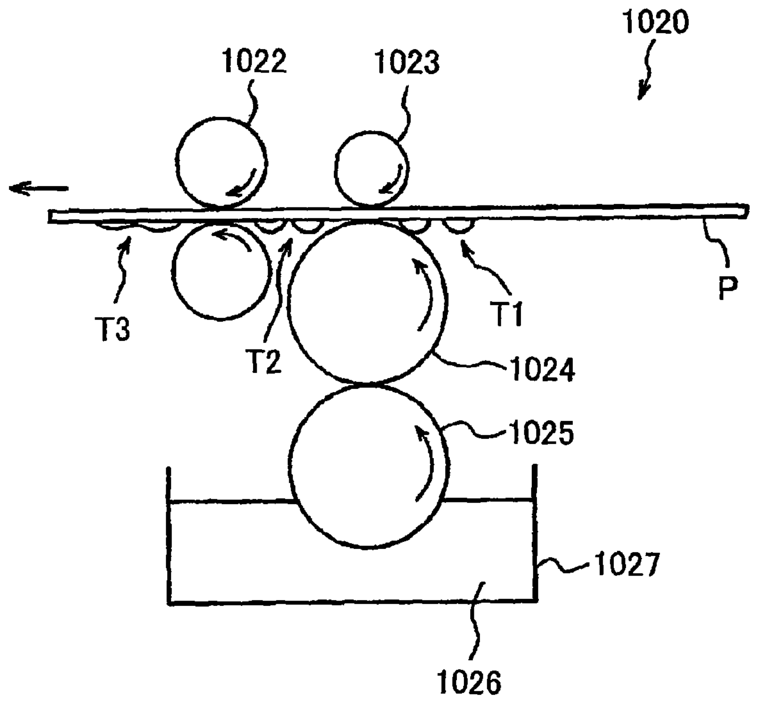
FIG. 13 shows a general configuration diagram of a fixing device of the copier shown in FIG. 10.

Next, the fixing device 1020 is described. FIG. 13 shows a general configuration of the fixing device 1020 included in the copier 1200.

The fixing device 1020 applies a wet-type fixing method, provides a fixing solution so as to melt or swell a toner image on a transfer paper or recording medium, and thus, fixes the toner image to the transfer paper P. The fixing device 1020 includes a fixing solution containing tank 1027 holding a fixing solution 1026, a fixing solution coating roller 1024 coating the fixing solution 1026 to the transfer paper P, and a fixing solution drawing roller 1025 drawing the fixing solution 1026 from the fixing solution containing tank 2027 and provides it to the fixing solution coating roller 1024. The fixing solution drawing roller 1025 has a wire bar. Further, at a position opposite to the fixing solution coating roller 1024 with respect to a conveyance path of the transfer paper P, a pressing roller 1023 presses the transfer paper P when the fixing solution 1026 is coated to the transfer paper P, and a pressing roller pair 1022 disposed on a downstream side of the pressing roller 1023 and pressing the transfer paper P having the fixing solution 1024 coated thereto. Details of the fixing solution 1026 are described later.

When the toner image on the transfer paper P is fixed, the fixing solution held by the fixing solution containing tank 1027 is drawn up by the fixing solution drawing roller 1025, and is provided to the fixing solution coating roller 1024. At this time, a quantity of the fixing solution 1026 drawn up by the fixing solution drawing roller 1025 is controlled in a fixed amount by a roughness provided on a surface of the fixing solution drawing roller 1025. The fixing solution 26 on the fixing solution drawing roller 1024 is kept in a state of a thin film, and is coated to the transfer paper P carrying the not-yet-fixed toner image T1. The not-yet-fixed toner image T1 is dissolved or swelled as a result of being provided with the fixing solution 1026, and thus, becomes a dissolved toner T2. When the fixing solution 1026 is coated to the transfer paper P, the transfer paper P is sandwiched by the fixing solution coating roller 1024 and the pressing roller 1023. Thereby, the fixing solution 1026 is positively and uniformly coated to the surface of the transfer paper P.

The transfer paper P having the fixing solution 1026 coated thereto is conveyed with being pressed by the pressing roller pair 1022. The pressing roller pair 1022 presses the dissolved or swelled toner T2 so that a surface thereof is smoothed, and thus, the toner image is given gloss. Further, as a result of the toner being thus pressed into fibers of unevenness on the surface of the transfer paper P, fixing performance can be improved. It is noted that, the surface of the dissolved toner T2 immediately after the fixing solution 1026 is coated has somewhat tackiness. However, after the pressing roller pair 1022 is passed through, the tackiness is eliminated, and thus, the fixed toner image T3 has a slippery surface. Thereby, even when the transfer papers having the images thus produced are stacked together, in an ejection tray not shown, after the fixing process, the transfer papers are prevented from adhering to each other due to their tackiness of the toner images otherwise existing there.

As the pressing roller pair 1022, a hard roller (metal roller) pair, or a pair of a hard roller and a soft roller (rubber roller) may be applied. Further, a material having reduced surface energy, such as a fluorine material is preferably coated to a surface of the rollers, so that the fixing solution 1026 is not likely to adhere thereto. The pressing roller pair 1022 may have a pressing roller cleaning blade provided therefor for removing a toner adhering to the surface thereof.

In the above-described fixing method with reference to FIG. 13, although it is different from thermal fixing, the fixing process can be carried out at a high speed. In fact, at an ordinary temperature (25° C.), fixing could be carried out at 500 mm/s in linear velocity, sufficiently with a fixing solution coating quantity equal to or less than 20 mg (diluted by water in a fixing solution concentration in a range between 3 and 5%) for a A4 paper. Further, it was found out that, as a result of the pair of pressing rollers being passed through, adherence was rather reduced. Accordingly, by increasing a fixing solution concentration, fixing can be carried out at a further higher speed.

In the fixing process in the fixing device 1020, drying of the solution by a heat is not carried out. By increasing the fixing speed of the fixing solution, as well as by reducing a required amount of the fixing solution to coat for the fixing, and also, by reducing the amount of the fixing solution in a level such that a liquid component still existing may spread in a fiber layer of the transfer paper, a problem of wrinkles of the paper can also be solved. Also for a transfer sheet in which the fixing solution does not seep, such as a coat paper, a film or such, a toner can be fixed to the transfer paper because of adherence provided by the fixing solution which exists even when evaporation therefrom does not occur. Further, a pressing roller, a blotter roller or such, may be provided.

A fixing solution applied for a wet-type fixing method is described next, in connection with the fixing device 1020 according to the present invention. First, problems existing in the prior art are described.

In the prior art, in many cases, a fixing solution may be harmful for humans, and thus, a safety issue exists. Although some solvent of a fixing solution is water which is not harmful for humans, a solute having a property to dissolve or swell a toner may have a safety problem.

Second, in many cases, a detergent or a solute to be mixed in a fixing solution for dissolving a solute in a solution may generate odor sensed by humans. As a result, when fixing is carried out for a large amount of printing matters, a user may feel unpleasantness.

The fixing solution 1026 according to the embodiment of the present invention solves these two problems.

For the first problem, $LD_{50}$ is applied as a safety index, and a fixing solution was produced in such a manner that each of a solvent and a solute has $LD_{50}$ not less than 3.0 g/kg. $LD_{50}$ is a toxicity index of American Industrial Hygiene Association, and means a 50 percent lethal dose. This corresponds to an amount such that, 50% of the number of individuals are dead when a certain amount of test solute or a sample to test is given to rats or guinea pigs. For example, dimethyl silicone oil has $LD_{50}$ of not less than 15 g/kg in oral administration. Since this means that a 50% lethal dose for a weight of individuals of 1 kg is not less than 15 g, a presumable lethal dose of silicone oil for a human of 65 kg is not less than 945 g accordingly.

$LD_{50}$ of salt is 3.0 g/kg, and, therefrom, it can be determined that a matter which is safer than salt should not be harmful for humans, and thus, for the fixing solution 1026 according to the embodiment of the present invention, each of the fixing solvent and the fixing solute having $LD_{50}$ of not less than 3.0 g/kg is applied. Further, for obtaining a further safer one, a material having $LD_{50}$ not less than 5.0 g/kg for each of the fixing solvent and the fixing solute is preferably applied.

For the second problem, an odor index is applied for odor sensed by humans, and the fixing solution 1026 was made to have an odor index not more than 10 in which solute was dissolved in a solvent. An odor index is a value obtained as follows. That is, first, a dilution ratio (referred to as an odor concentration, hereinafter) obtained when a relevant gas or a solution is diluted by odor-free air or solution (water) into a level such that the relevant odor may not be sensed, and then, a common logarithm of the thus-obtained value is multiplied by 10. That is, an odor index is obtained by the following formula:

$$\text{Odor index}=10\times\log(\text{odor concentration})$$

For example, when no odor is sensed after an odorous gas or solution is diluted by an odorless gas or solution by 100 times, the odor concentration is 100, and thus, from the following calculation, an odor index of 20 is obtained:

$$\text{Odor index}=10\times\log 100=10\times 2=20.$$

Further, many local governments which apply the odor index as a regulatory criterion for odor imply a restriction that the odor index should be not more than 10 at a boundary of a factory, or a business place. Further, the odor index 10 corresponds to a level such that, 18 humans of 20 humans do not sense odor from a gas obtained from ten times dilution of an odorous gas. Accordingly, it is determined that, a matter having an odor index not more than 10 should be odorless, and thus, as the fixing solution 1026 according to the embodiment of the present invention, one having an odor index, not more than 10, can be applied.

Further, in an art disclosed by Japanese Patent No. 3290513, mentioned above, a toner is dissolved in a manner in which a solute (toluene, benzene, MEK or such) for dissolving a toner is dispersed and mixed (not dissolved) in water as a solvent, which is a very safe solution, that is, in a so-called underwater extraction type emulsion. That is, in this method, a fixing solution is applied to dissolve or swell a toner, in which solution, a solute which is insoluble or is difficult to be dissolved to water, is dispersed and mixed in water. Such a fixing solution is inferior in terms of processing speed for swelling or dissolving a toner, in comparison to a fixing solution in which a solute is soluble to a solvent. A reason therefor is described next.

That is, droplets, or emulsion particles of toluene, benzene or such dissolving or swelling a toner, have a particle diameter in a range between microns and tens of microns, and may becomes larger particles. A long time is required for such large emulsion particles contacting a toner and penetrating the same, after the fixing solution is coated to a transfer paper and is given to the toner. Further, since such a type of fixing solution has a state in which a solute is dispersed in a solvent, a concentration of solute having a property to dissolve or swell a toner is not uniform in the fixing solution, and thus, performance of dissolving or swelling the toner is not uniform. Thereby, non-uniformity may occur in a toner fixing condition on a recording medium, and thus, fixing quality may degrade.

In order to solve this problem, in the fixing solution 1026 in the embodiment of the present invention, a combination such that a solute is soluble to a solvent is applied. In such a fixing solution, since a solute is completely dissolved in a solvent, penetration in a toner layer is easier, and a speed of dissolving or swelling the toner increases. Further, when a solute is soluble to a solvent, the solute having a property of dissolving or swelling a toner contacts a toner image in a uniform concentration in the fixing solution, and thus, a fixing condition of the toner becomes uniform, and fixing quality can be improved.

Further, when an emulsion type fixing solution is applied in which a solute is insoluble or difficult to be dissolved in a solvent, it is a two-ingredient system of oil droplets as a solute and water as a solvent. Accordingly, concentration management is required when it is actually applied. Therefore, a complicated mechanism such as a concentration detecting device, a stirring device in a container holding fixing solution, or such is required. In contrast thereto, when a combination in which a solute is soluble to a solvent, as in the fixing solution 1026, is applied, such a complicated mechanism as a concentration detecting device, a stirring device in a container holding fixing solution, or such is not required.

As a toner applicable in the image forming apparatus 1200 described above with reference to FIG. 10, together with the above-mentioned fixing solution 1026, one having a coloring agent insoluble to the fixing solution should be preferably applied. When a coloring agent soluble to the fixing solution is applied, part of the coloring agent may be dissolved in the fixing solution. When part of the coloring agent is dissolved in the fixing solution, a position other than an image part on a recording medium or transfer paper may be colored therewith or a background part may be stained, and thus, image quality may degrade. By applying a coloring agent of a toner insoluble to the fixing solution, dissolving of a dye is avoided by the fixing solution, and thus, degradation in image quality otherwise occurring due to the dissolving phenomena can be positively avoided.

As such a coloring agent, the followings may be applied:

As a carbon black made by Mitsubishi Chemical Corporation, #2700, #2650, #2600, #2400, #2300, #2200, #1000, #990, #980, #970, #960, #950, #900, #750, #650, MA600, MA77, MA8, and, for color printing, MA11, MA100, MA100S, MA230, #50, #47, #32, #30, #25, #20, #5, #95 and #260 or such may be applied. As those made by Orient Chemical Industries, LTD., SPIRIT BLACK SB, SSBB, AB; NIGROSINE BASE SA, SAP, SAP-L, EE, EEL, EX, EX-B, EB or such may be applied. These are insoluble to the fixing solution, and thus, are suitable. On the other hand, an oil soluble dye of Orient Chemical Industries, LTD. may also be applied. However, those soluble to the solvent of the fixing solution should not be selected. For example, when WATEER YELLOW 1, 2, 6, 18, WATEER RED 1, 2, 3, 27, WATEER BLUE 3, 9, 105 and WATEER BLACK 100-L, 187-LM, R-455, R-456 or such is applied, the fixing solution with a base of water is positively dissolved, and thus, an image blurs.

As a fixing solute included in the fixing solution 1026, aliphatic ester is applied which has solubility or a swelling property to the resin included in the toner. The fixing solution 1026 can rapidly fix a not-yet-fixed toner image. This may be because, aliphatic ester is held in a soluble state as mentioned above, and thus, it is likely to contact minute toner particles on the order in a range between 5.0 and 6.0 μm in its particle size, and thus, penetration of aliphatic ester to the toner becomes easier.

As the aliphatic ester, not only liquid having flowability, but also gelatinous liquid, semisolid, such as a wax, may be applied. Viscosity of the aliphatic ester should be preferably in a range between 1.0 mPa·s and 100 Pa·s.

A solute included in the fixing solution 1026 preferably includes water. Thereby, odor can be further reduced. Water does not correspond to a volatile organic compound (VOC), and thus, water is very advantageous for an office environment.

However, although solubility of aliphatic ester with respect to water is generally low, the aliphatic ester applied in the fixing solution 1026 should be held in a soluble state in water. As a method therefor, the following method may be applied. That is, water is added to a detergent having a HLB value on the order of a range between 5 and 16, the aliphatic ester is added, and after that, stirring is carried out for a long time with a heat. As the detergent having the HLB value on the order of a range between 5 and 16, sucrose fatty esters such as sucrose laurate ester, sucrose myristate ester, sucrose ester stearate, or such, may be applied.

Further, as a solvent of the fixing solution 1026, a mixed solvent of water and a water soluble solvent may be applied. Also in this case, it is preferable that, after aliphatic ester is once brought into a hydrophilic material such as an amphipathic organic compound, a water soluble polymer, a silica gel, or such, the aliphatic ester is held in a soluble state. As the water soluble solvent, ethanol, isopropanol or such may be applied.

As a good solvent for the aliphatic ester, a hydrophobic solvent may be applied. As such a solvent, silicone oils, an olefin family solvent, a paraffin family solvent, a fluorine family solvent or such may be applied, and, it is preferable to select from solvents having $LD_{50}$ of more than 3 g/kg. As the silicone oils, tetramer, pentamer or such of polydimethylsiloxane or methylcyclosilixane having a viscosity on the order of a range between 1.0 and 10 mPa·s is suitable. As the paraffin family solvent, n-decane, n-dodecane, n-undecane, or such is suitable. As the fluorine family solvent, hydrofluoroether or such is suitable. Further, the solvent preferably has an appropriate volatility, and preferably has a boiling point in a range between 50 and 150° C.

A content of the aliphatic ester in the solvent is preferably on the order of a range between 0.5 and 50 weight %, and further preferably, in a range between 1 and 10 weight %. When the content of aliphatic ester is smaller than 0.5 weight %, an effect of dissolving or swelling a toner is not sufficient, while, when it is larger than 50 weight %, flowability of the toner cannot be reduced for a long time, and a fixed toner layer may have adherence.

An odor index of the aliphatic ester is preferably not more than 10. Thereby, discomfort can be removed in an ordinary office environment. When the aliphatic ester or the solvent generates unpleasant smell or irritating smell, usage in an office environment is not appropriate. Especially, the aliphatic ester still remains after the toner is fixed, generation of unpleasant smell or irritating smell is not preferable for use. It is noted that, as a practical and accurate scale for odor for an office environment or such, the above-mentioned odor index (10 log(dilution ratio for reaching a no smelling state)) by means of Triangle Odor Bag Method for Odor Sensory Measurement, which is a sensory measurement, is applied.

Further, when the solvent has unpleasant smell or irritating smell, odor is generated at a time of fixing. Since a content of the solvent in the fixing solution is large, the odor index should be preferably not more than 7, and further, preferably, not more than 3.

The aliphatic ester is preferably saturated aliphatic ester. Since saturated aliphatic ester does have a radical component, storage stability (durability against oxidation or hydrolysis) can be improved. Further, safety for humans is high, and a resin included in a toner can be dissolved or swelled within one second. Further, saturate aliphatic ester has reduced adherence in a toner layer after the solvent evaporates therefrom. This may be because, saturated aliphatic acid produces an oil film on a surface of a softened toner layer.

The saturated aliphatic ester is a compound expressed by the following general formula:

$$R_1COOR_2$$

where it is preferable that $R_1$ denotes an alkyl group having a carbon number in a range between 11 and 14, and $R_2$ denotes an alkyl group having a carbon number in a range between 1 and 3. Thereby, solubility with respect to resin included in toner can be improved. Further, an odor index is not more than 10, and thus, unpleasant smell or an irritating smell is not generated.

As the saturated aliphatic ester, ethyl laurate, hexyl laurate, ethyl tridecylate, isopropyl tridecylate, ethyl myristate, isopropyl myristate, or such, may be applied. As the resin included in the toner, polystyrene resin, styrene-acryl copolymer resin or polyester resin is suitable. Further, a wax component such as a polyethylene or such may be included in the toner.

The aliphatic ester preferably includes aliphatic dicarboxylate ester. Thereby, the resin included in the toner can be rapidly dissolved or swelled. For a high speed printing on the order of 60 ppm, a time required for providing the fixing solution to a not-yet-fixed toner image and fixing the toner may be preferably within one second. The above-mentioned configuration that the aliphatic dicarboxylate ester is included can satisfy this requirement. Further, since even a reduced amount of addition can result in dissolving or swelling of the resin included in the toner, a ratio of the softener required for the solvent in the fixing solution can be reduced. For example, when a water soluble solvent is applied, the toner can be fixed with a softener content not more than 5 weight %.

The aliphatic dicarboxylate ester has the following general formula:

$$R_3(COOR_4)_2$$

where it is preferable that $R_3$ denotes an alkylene group having a carbon number in a range between 3 and 8, and $R_4$ denotes an alkyl group having a carbon number in a range between 2 and 5. Thereby, solubility with respect to the resin included in the toner can be improved. Further, since an odor index is not more than 10, unpleasant smell or irritating smell is not generated.

As the aliphatic dicarboxylate ester, diethyl succinate, diethyl adipate, diisobutyl adipate, diisopropyl adipate, diisodecyl adipate, diethyl sebacate, dibutyl sebacate, or such may be applied. As the resin included in the toner, polystyrene resin, styrene-acryl copolymer resin or polyester resin is suitable. Further, a wax component such as a polyethylene or such may be included in the toner.

The aliphatic ester preferably includes aliphatic dicarboxylate dialkoxyalkyl. Thereby, toner fixing performance can be improved. The aliphatic dicarboxylate dialkoxyalkyl is slightly dissolved in water, and thus, it can be easily held in a soluble state when water is applied as a solvent.

The aliphatic dicarboxylate dialkoxyalkyl has the following general formula:

$$R_5(COOR_6—O—R_7)_2$$

where it is preferable that $R_5$ denotes an alkylene group having a carbon number in a range between 2 and 8; $R_6$ denotes an alkylene group having a carbon number in as range between 2 and 4; and $R_7$ denotes an alkyl group having a carbon number in a range between 1 and 4. Thereby, solubility with respect to the resin included in the toner can be improved. Further, since an odor index is not more than 10, unpleasant smell or irritating smell is not generated.

As the aliphatic dicarboxylate dialkoxyalkyl, succinate diethoxyethyl, succinate dibutoxyethyl, diethoxyethyl adipate, dibutoxyethyl adipate, diethoxyethyl sebacate or such can be applied.

Next, further specific embodiments applied as the above-mentioned fixing solution 1026 is described. It is noted that the embodiments merely exemplify those applicable as the fixing solution 1026, and the fixing solution 1026 is not limited thereto.

An embodiment 1 of the fixing solution 1026 is described.

In the embodiment 1, a transparent fixing solution was produced as a result of 5.0 weight % of hexyl laureate (softener (solute); $LD_{50}$=8.0 g/kg) and 95 weight % of dimethylsiloxane (solvent; 1.0 mPa·s, $LD_{50}$=15 g/kg) being mixed and stirred. A fixing part of a printer Ipsio CX6100 (made by Ricoh Co., Ltd.) was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the solute as the softener was 1, an odor index of the solution was 0, and an odor index of the fixing solution was 0. Further, no unpleasant odor was generated in an office when the toner image was fixed.

The above-mentioned hexyl laurate is saturated aliphatic ester, and is a compound having a general formula of $R_1$—COO—$R_2$. $R_1$ denotes an alkyl group having a carbon number in a range between 11 and 14, while $R_2$ denotes an alkyl group having a carbon number in a range between 1 and 3.

An embodiment 2 of the fixing solution 1026 is described.

In the embodiment 2, a transparent fixing solution was produced as a result of 10 weight % of isopropylmyristate (softener (solute); $LD_{50}$=8.0 g/kg) and 90 weight % of dimethylsiloxane being mixed and stirred. A fixing part of a printer Ipsio CX6100 (made by Ricoh Co., Ltd.) was not heated, and the fixing solution was coated with the use of a coating device shown in FIG. 13 on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the solute as the softener was 0, an odor index of the solution was 0, and an odor index of the fixing solution was 0. Further, no unpleasant odor was generated in an office when the toner image was fixed.

The above-mentioned isopropyl myristate is saturated aliphatic ester, and is a compound having a general formula of $R_1$—COO—$R_2$. $R_1$ denotes an alkyl group having a carbon number in a range between 11 and 14, while $R_2$ denotes an alkyl group having a carbon number in a range between 1 and 3.

An embodiment 3 of the fixing solution 1026 is described.

In the embodiment 3, a transparent fixing solution was produced as a result of 7.0 weight % of ethyl laureate (softener (solute); $LD_{50}$=3.0 g/kg) and 93 weight % of n-hexane (solvent; $LD_{50}$=28.7 g/kg) being mixed and stirred. A fixing part of a printer Ipsio CX6600 (made by Ricoh Co., Ltd.) was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the solute as the softener was 13, an odor index of the solution was 0, and an odor index of the fixing solution was 10. Further, no unpleasant odor was generated in an office when the toner image was fixed.

The above-mentioned ethyl laurate is saturated aliphatic ester, and is compound having a general formula of $R_1$—COO—$R_2$. $R_1$ denotes an alkyl group having a carbon number in a range between 11 and 14, while $R_2$ denotes an alkyl group having a carbon number in a range between 1 and 3.

An embodiment 4 of the fixing solution 1026 is described.

In the embodiment 4, a transparent fixing solution was produced as a result of 5.0 weight % of dibutylsebacate (softener (solute); $LD_{50}$=14.9 g/kg) and 95 weight % of hydrofluoroether (solvent; $LD_{50}$>5.0 g/kg) being mixed and stirred. A fixing part of a printer Ipsio CX6600 (made by Ricoh Co., Ltd.) was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the solute as the softener was 3, an odor index of the solution was 2, and an odor index of the fixing solution was 2. Further, no unpleasant odor was generated in an office when the toner image was fixed.

The above-mentioned dibutylsebacate is aliphatic dicarboxylate ester, and is a compound having a general formula of $R_3$—(COO—$R_4$)$_2$. $R_3$ denotes an alkylene group having a carbon number in a range between 3 and 8, while $R_4$ denotes an alkyl group having a carbon number in a range between 2 and 5.

An embodiment 5 of the fixing solution 1026 is described.

In the embodiment 5, a transparent fixing solution was produced as a result of 4.0 weight % of isobutyladipate (softener (solute); $LD_{50}$=12.3 g/kg) and 96 weight % of dimethylsiloxane being mixed and stirred. A fixing part of a printer Ipsio CX6600 (made by Ricoh Co., Ltd.) was not heated, and the fixing solution was coated with the use of a coating device shown in FIG. 13 on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 3, an odor index of the solution was 0, and an odor index of the fixing solution was 0. Further, no unpleasant odor was generated in an office when the toner image was fixed.

The above-mentioned isobutyladipate is aliphatic dicarboxylate ester, and is compound having a general formula of $R_3$—(COO—$R_4$)$_2$. $R_3$ denotes an alkylene group having a carbon number in a range between 3 and 8, while $R_4$ denotes an alkyl group having a carbon number in a range between 2 and 5.

An embodiment 6 of the fixing solution 1026 is described.

In the embodiment 6, a transparent fixing solution was produced as a result of 10 weight % of diethoxy ethyl succinate (softener; $LD_{50}$=5.0 g/kg) and 90 weight % of hydrofluoroether being mixed and stirred. A fixing part of a printer Ipsio CX6600 (made by Ricoh Co., Ltd.) was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the solute as the softener was 1, an odor index of the solution was 0, and an odor index of the fixing solution was 0. Further, no unpleasant odor was generated in an office when the toner image was fixed.

The above-mentioned diethoxy ethyl succinate is aliphatic dicarboxylate ester, and is compound having a general formula of $R_3$—(COO—$R_4$)$_2$. $R_3$ denotes an alkylene group having a carbon number in a range between 3 and 8, while $R_4$ denotes an alkyl group having a carbon number in a range between 2 and 5.

An embodiment 7 of the fixing solution 1026 is described.

In the embodiment 7, a transparent fixing solution was produced as a result of 2.0 weight % of ethyllaurate, 97 weight % of water (solvent) and 1.0 weight % of sucrose laurate ester (detergent; HLB value=16) being mixed and stirred. A fixing part of a printer LaserJet 3500 (made by Hewlett Packard Company) was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 3, an odor index of the solution was 0, and an odor index of the fixing solution was 0. Further, no unpleasant odor was generated in an office when the toner image was fixed.

An embodiment 8 of the fixing solution 1026 is described.

In the embodiment 8, a transparent fixing solution was produced as a result of 4.0 weight % of diisobutyladipate, 20 weight % of ethanol (solvent; $LD_{50}$=20 g/kg), 75 weight % of water and 1.0 weight % of sucrose laurate ester being mixed and stirred. A fixing part of a printer Ipsio CX6600 was not heated, and the fixing solution was coated with the use of a carting device shown in FIG. 13 on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 1, an odor index of the solution was 0, and an odor index of the fixing solution was 0. Further, no unpleasant odor was generated in an office when the toner image was fixed. Further, after the fixing solution was put in a closed vessel and was stored for one month at 50° C., neither decomposition nor separation occurred in diisobutyladipate and performance of the fixing solution was satisfactory.

An embodiment 9 of the fixing solution 1026 is described.

In the embodiment 9, a transparent fixing solution was produced as a result of 9.0 weight % of diethoxyethyl succinate, 90 weight % of water and 1.0 weight % of sucrose laurate ester being mixed and stirred. A fixing part of a printer Ipsio CX6600 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 1, an odor index of the solution was 0, and an odor index of the fixing solution was 0. Further, no unpleasant odor was generated in an office when the toner image was fixed. Further, after the fixing solution was put in a closed vessel and was stored for one month at 50° C., neither decomposition nor separation occurred in diethoxyethyl succinate and performance of the fixing solution was satisfactory.

An embodiment 10 of the fixing solution 1026 is described.

In the embodiment 10, a transparent fixing solution was produced as a result of 10 weight % of diethoxyethyl succinate, 10 weight % of ethanol, 79 weight % of water and 1.0 weight % of nonionic detergent being mixed and stirred. A fixing part of a printer Ipsio CX6600 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 5 seconds later, no toner adhered to the waste, and the toner was fixed to the paper. Further, an odor index of the softener was 1, an odor index of the solution was 0, and an odor index of the fixing solution was 0. Further, no unpleasant odor was generated in an office when the toner image was fixed. Further, after the fixing solution was put in a closed vessel and was stored for one month at 50° C., neither decomposition nor separation occurred in diethoxyethyl succinate and performance of the fixing solution was satisfactory.

A comparison example 1 for the fixing solution 1026 is described next.

In the comparison example 1, an emulsified fixing solution was produced as a result of 2.0 weight % of isobutyl palmitate (softener; $LD_{50}$=8.0 g/kg), 97 weight % of water and 1.0 weight % of sucrose laurate ester being mixed and stirred. A fixing part of a printer Ipsio CX6600 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 20 seconds later, the toner hardly adhered to the paper, and the toner stuck to the waste.

A comparison example 2 for the fixing solution 1026 is described.

In the comparison example 2, an emulsified fixing solution was produced as a result of 2.0 weight % of isopropyl palmitate (softener; $LD_{50}$=8.0 g/kg), 97 weight % of water and 1.0 weight % of sucrose laurate ester being mixed and stirred. A fixing part of a printer LaserJet 3500 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 20 seconds later, the toner hardly adhered to the paper, and the toner stuck to the waste.

A comparison example 3 for the fixing solution 1026 is described next.

In the comparison example 3, an emulsified fixing solution was produced as a result of 2.0 weight % of methylcaprylate (softener; $LD_{50}$=3.0 g/kg), 97 weight % of water and 1.0 weight % of sucrose laurate ester being mixed and stirred. A fixing part of a printer Ipsio CX6600 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 20 seconds later, no toner adhered to the waste, and the toner was firmly fixed to the paper. However, an odor index of the softener was 13, an odor index of the solution was 0, and an odor index of the fixing solution was 11. As a result, rancid acid odor hanged in an office when the toner image was fixed.

A comparison example 4 for the fixing solution 1026 is described next.

In the comparison example 4, an emulsified fixing solution was produced as a result of 5.0 weight % of isobutyladipate, 94 weight % of water and 1.0 weight % of nonionic detergent being mixed and stirred. A fixing part of a printer Ipsio CX6600 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 20 seconds later, the toner was fixed to the paper to some extent, but the toner adhered to the waste. Further, after the fixing solution was put in a closed vessel and was stored for one month at 50° C., phase separation occurred between isobutyladipate and water, and performance of the fixing solution degraded.

A comparison example 5 for the fixing solution 1026 is described next.

In the comparison example 5, an emulsified fixing solution was produced as a result of 10 weight % of diethoxyethyl succinate, 79 weight % of water and 1.0 weight % of nonionic detergent being mixed and stirred. A fixing part of a printer Ipsio CX6600 was not heated, and the fixing solution was sprayed and coated on a PPC paper on which a not-yet-fixed toner image was produced. Then, at each time of 5 seconds later, 10 seconds later and 20 seconds later, a surface of the image was rubbed by a waste, and fixing performance was evaluated from whether or not toner adhered to the waste.

As a result, at the time of 20 seconds later, the toner was fixed to the paper to some extent, but the toner adhered to the waste. Further, after the fixing solution was put in a closed vessel and was stored for one month at 50° C., phase separation occurred between the diethoxyethyl succinate and the water, and performance of the fixing solution degraded.

Thus, according to the embodiments described above with reference to FIGS. 10 through 13, the fixing solution is made of a fixing solute having a property of dissolving or swelling the toner forming a toner image, and a fixing solvent diluting the fixing solute. Since the fixing solution is a solution, the fixing solute having the property to dissolve or swell the toner can be made to contact the toner image uniformly when the fixing solution is provided to the toner image. Accordingly, the fixing solute easily penetrates the toner, and thus, can dissolve or swell the toner rapidly. Further, aliphatic ester, having solubility or a swelling property for a resin included in the toner, is applied. By applying aliphatic ester as the fixing solute, generation of odor can be reduced. Thereby, a fixing method and a fixing device can be provided by which, fixing of a toner can be rapidly carried out, and also, generation of odor is reduced.

Further by including saturated aliphatic ester in aliphatic ester, storage stability can be improved. Especially, when saturated aliphatic ester is a compound expressed by a general formula of $R_1COOR_2$, where $R_1$ denotes an alkyl group with a carbon number in a range between 11 and 14, and $R_2$ denotes an alkyl group with a carbon number in a range between 1 and 3, solubility or a swelling property for a resin included in a toner can be improved.

By including aliphatic dicarboxylate ester in aliphatic ester, a resin included in a toner can be rapidly dissolved or swelled. Especially, when aliphatic dicarboxylate ester is a compound expressed by a general formula of $R_3(COOR_4)_2$, where $R_3$ denotes an alkylene group with a carbon number in a range between 3 and 8, and $R_4$ denotes an alkyl group with a carbon number in a range between 2 and 5, solubility or a swelling property for a resin included in a toner can be improved.

By including aliphatic dicarboxylate dialkoxyalkyl in aliphatic ester, toner fixing performance can be improved. Especially, when aliphatic dicarboxylate dialkoxyalkyl is a compound expressed by a general formula of $R_5(COOR_6—O—R_7)_2$, where $R_5$ denotes an alkylene group with a carbon number in a range between 2 and 8, $R_6$ denotes an alkylene group with a carbon number in a range between 2 and 4, and $R_7$ denotes an alkyl group with a carbon number in a range between 1 and 4, solubility or a swelling property for resin included in toner can be improved.

Further, by including water as a solvent, odor can be further reduced.

Further, the fixing device 1020 has the fixing solution coating roller 1024 which conveys the fixing solution 1026 in a thin film state on its surface, and provides the fixing solution 1026 in the thin film state to a transfer paper. By thus providing the fixing solution 1026 in the thin film state to the transfer paper, fixing speed can be improved. Further, the transfer paper is prevented from rolling when the fixing solution 1026 is provided to the not-yet-fixed toner image.

Further, the fixing device 1020 has the pressing roller pair 1022 on the transfer paper conveyance downstream side of the fixing solution coating roller 1024 for pressing the transfer paper which has been thus provided with the fixing solution 1026. The transfer paper having the fixing solution 1026 coated thereto is conveyed with a pressure applied thereto by the pressing roller pair 1022. As a result of the pressing roller pair 1022 pressing the toner image, a surface of the toner layer thus dissolved or swelled is smoothed, and thus, gloss is given to the toner image. Further, as a result of the toner being pressed into fibers of unevenness of the transfer paper surface, the fixing performance can be improved. It is noted that, the toner layer surface has somewhat tackiness immediately after the coating of the fixing solution thereto. However, as a result of passing through the pressing roller pair 1022, the tackiness is eliminated, and thus, slipperiness is given. Thereby, even when the transfer papers having the images thus produced are stacked together in an ejection tray, not shown, after the fixing process, the transfer papers are prevented from adhering to each other, due to their tackiness of the toner images otherwise existing there.

A variant embodiment of the fixing device 1020 in the above-described embodiment described with reference to FIG. 13, is described next.

In the fixing device 1020 in the above-mentioned embodiment described with reference to FIG. 12, the fixing solution coating roller 1024 is applied as a configuration to provide the fixing solution 1026 to the not-yet-fixed toner image T1 transferred to the transfer paper P, and the fixing solution 1026 is coated to the transfer paper P with contacting the transfer paper P. However, a configuration to provide the fixing solution 1026 to the not-yet-fixed toner image T1 is not limited thereto. As the variant embodiment 1, a configuration in which the fixing solution in a mist state is provided to the not-yet-fixed toner image T1 transferred to the transfer paper P is described, below.

Figure 14:
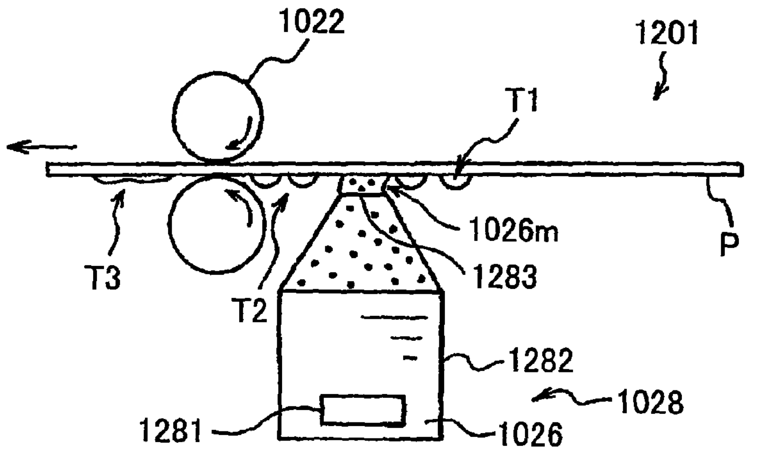
FIG. 14 shows a general configuration diagram of a fixing device in a variant embodiment 1 of the embodiment of FIG. 10.

FIG. 14 shows a general configuration of a fixing device 1201, according to the present invention, which is a variant embodiment of the fixing device 1020 described with reference to FIG. 13. Other than a configuration of providing the fixing solution 1026 to the not-yet-fixed toner image T1, a configuration of the fixing device 1201 in the variant embodiment 1 is the same as the fixing device 1020 in the embodiment of FIG. 13, and duplicated description is omitted.

As shown in FIG. 14, in the fixing device 1201 in the variant embodiment 1, as a device for providing the fixing solution 1026 to the not-yet-fixed toner image T1, a fixing solution mist device 1028 is provided. This fixing solution mist device 1028 includes a fixing solution tank 1282, a spray mouth 1283 in proximity to a transfer paper conveyance path and a vibration member 1281 in the fixing solution tank 1282, where the vibration member 1281 is a member vibrating under the control of a control part not shown.

In the fixing device 1201, the vibration member 1281 is provided in the fixing solution tank 1282, and, as a result of the vibration member 1281 vibrates with ultrasonic wave, the fixing solution 1026 in the fixing solution tank 1282 becomes mist, referred to as fixing mist 1026*m*, hereinafter. The fixing mist 1026*m*, i.e., the fixing solution 1026, is provided to the transfer paper P via the spray mouth 1283. As the fixing solution mist device 1028, a mechanism the same as a common humidifier applying ultrasonic wave vibration may be applied.

In this configuration of the variant embodiment 1 shown in FIG. 14, since the fixing solution is provided to the not-yet-fixed toner image T1 as the fixing mist 1026*m*, no member should directly contact the not-yet-fixed toner image T1 for providing the fixing solution 1026 thereto, different from the configuration employing the coating roller. When a member directly contacts the not-yet-fixed toner image T1 for providing the fixing solution thereto, the not-yet-fixed toner image T1 may be distorted due to the contact. In contrast thereto, in the fixing device 1201 of FIG. 14, since the fixing solution 1026 can be provided to the not-yet-fixed toner image T1 in a non-contact manner, i.e., without any member directly contacting it, and thus, a distortion, otherwise occurring due to a direct contact of a member to the not-yet-fixed toner image T1 for providing thereto the fixing solution 1026, can be positively avoided.

In the fixing device 1201 described above with reference to FIG. 14, the fixing solution 1026 is provided in a form of the fixing mist 1026*m*, as a configuration to provide the fixing solution 1026 to the not-yet-fixed toner image T1 in a non-contact manner. However, a configuration to provide the fixing solution 1026 to the not-yet-fixed toner image T1 in a non-contact manner is not limited thereto. Below, as a variant embodiment 2 of the embodiment described with reference to FIG. 13, the fixing solution in a form of droplets is provided to the not-yet-fixed toner image T1 transferred to the transfer paper P is described with reference to FIG. 15.

Figure 15:
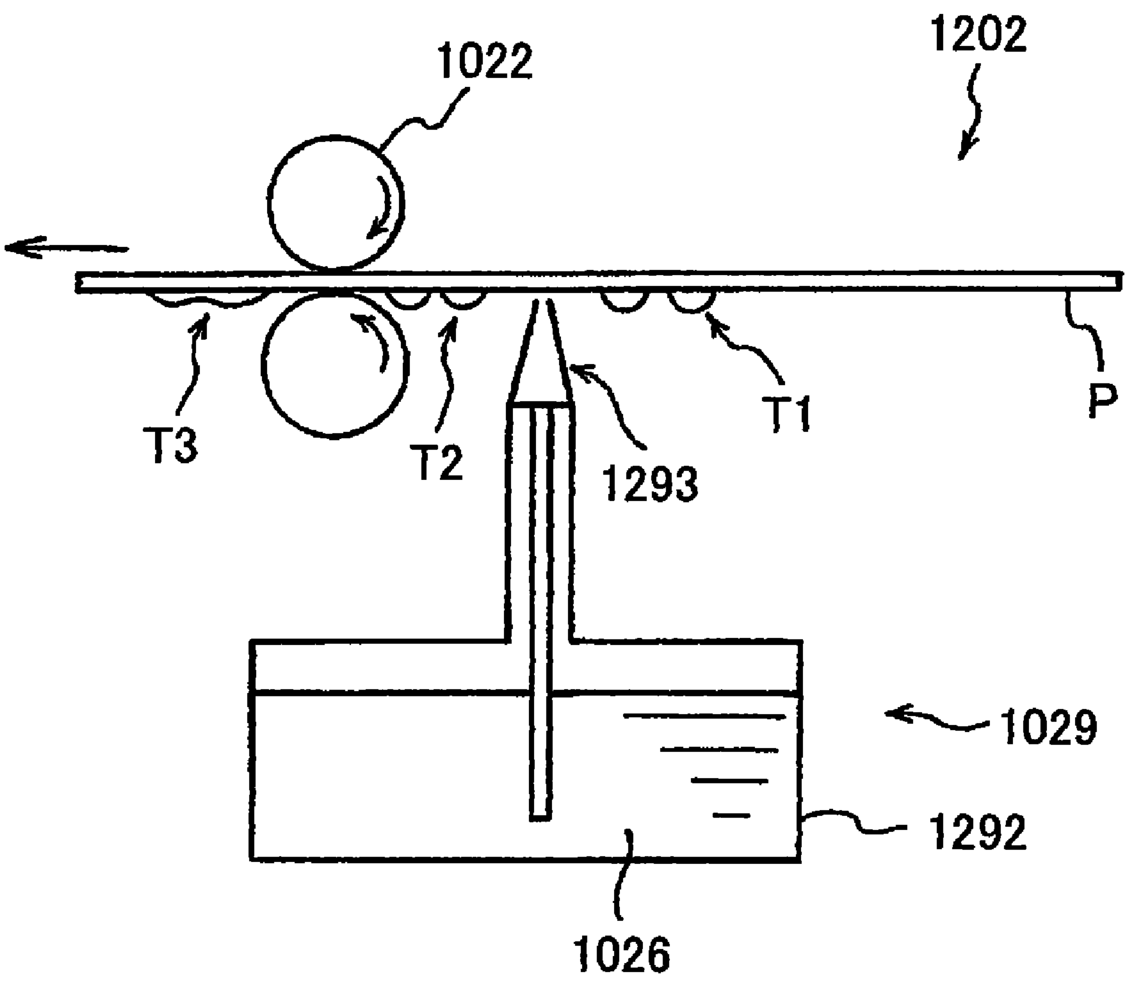
FIG. 15 shows a general configuration diagram of a fixing device in a variant embodiment 2 of the embodiment of FIG. 10.

FIG. 15 shows a general configuration of a fixing device 1202 in the variant embodiment 2 according to the present invention. Other than a configuration of providing the fixing solution 1026 to the not-yet-fixed toner image T1, a configuration of the fixing device 1201 in the variant embodiment 1 is the same as the fixing device 1020 in the embodiment of FIG. 13, and duplicated description is omitted.

In the fixing device 1202 in the variant embodiment 2, as a device for providing the fixing solution 1026 to the not-yet-fixed toner image T1, a fixing solution nozzle spray unit 1029 is provided. The fixing solution nozzle spray unit 1029 includes a fixing solution containing part 1292 and a nozzle hole 1293 in proximity to the transfer paper P conveyance path.

In the fixing device 1202, a pressure generating device, not shown, is provided in the fixing solution containing part 1292, and, as a result of the pressure generating device increasing a pressure inside the fixing solution containing part 1292, the fixing solution 1026 in a form of droplets is sprayed to the not-yet-fixed toner image T1 on the transfer paper P through the nozzle hole 1293. Since the fixing solution 1026 in a form of droplets is sprayed through the nozzle hole 1293, the fixing solution 1026 can be provided to the not-yet-fixed toner image T1 in a non-contact manner, i.e., without any member directly contacting it. As the fixing solution nozzle spray unit 1029, a mechanism the same as that of a head part of a common ink-jet printer may be applied.

In this configuration of the variant embodiment 2 shown in FIG. 15, since the fixing solution is provided to the not-yet-fixed toner image T1 as a result of it being sprayed in a form of droplets, no member should directly contact the not-yet-fixed toner image T1 for providing the fixing solution 1026 thereto, different from the configuration employing the coating roller. Accordingly, the same as the above-described variant embodiment 1 of FIG. 14, since the fixing solution 1026 can be provided to the not-yet-fixed toner image T1 in a non-contact manner, i.e., without any member directly contacting it, and thus, a distortion, otherwise occurring due to a direct contact of a member to the not-yet-fixed toner image T1 for providing thereto the fixing solution 1026, can be positively avoided.

Since a mechanism the same as that of a head part of a common ink-jet printer may be applied as mentioned above as the fixing solution nozzle spray unit 1029, a configuration may be provided such that a position at which droplets of the fixing solution 1026 is provided can be controlled, the same as an ordinary printing operation of the ink-jet printer. By thus controlling a position at which droplets of the fixing solution are provided, the fixing solution 1026 can be provided only to a position of the not-yet-fixed toner image T1 on the transfer paper P. When the fixing solution 1026 can be provided only to a position where the not-yet-fixed toner image T1 actually exists on the transfer paper P as mentioned above, fixing can be achieved only with a minimum necessary amount of the fixing solution, and thus, a consumption of the fixing solution can be reduced.

Further, the present invention is not limited to the above-described embodiments, and variations and modifications may be made without departing from the basic concept of the present invention claimed below.

The present application is based on Japanese Priority Applications Nos. 2004-319429 and 2004-375734, filed on Nov. 2, 2004 and Dec. 27, 2004, respectively, the entire contents of which are hereby incorporated herein by reference.

What is claimed is:

1. A fixing solution for fixing a toner to a recording medium, comprising:

an aliphatic dicarboxylate dialkoxyalkyl held by a water in a soluble manner, and having solubility or a swelling property with respect to a resin included in the toner, wherein said aliphatic dicarboxylate dialkoxyalkyl comprises a compound expressed by the following general formula:

$$R_5(COOR_6—O—R_7)_2,$$

where:

$R_5$ denotes an alkylene group having a carbon number in a range between 2 and 8;

$R_6$ denotes an alkylene group having a carbon number in a range between 2 and 4; and $R_7$ denotes an alkyl group having a carbon number in a range between 1 and 4.

2. A capsule structure comprising:

a core agent comprising the fixing solution claimed in claim 1; and an outer skin comprising a material insoluble with respect to said core agent.

3. The fixing solution of claim 1, wherein the aliphatic dicarboxylate dialkoxyalkyl is a member selected from the group consisting of succinate diethoxyethyl, succinate dibutoxyethyl, diethoxyethyl adipate, dibutoxyethyl adipate, and diethoxyethyl sebacate.

4. The capsule structure of claim 2, wherein the outer skin comprises a material selected from the group consisting of resins and metal oxide materials.

5. The capsule structure of claim 4, wherein the outer skin comprises a resin selected from the group consisting of polyethylene, polypropylene, polyurea resin, polyurethane resin, polyacrylonitrile, cross-linked methyl polymethacrylate, and cross-linked polyvinyl alcohol.

6. The capsule structure of claim 4, wherein the outer skin comprises a metal oxide material selected form the group consisting of titanium oxide, magnesium oxide, and silicon oxide.

* * * * *